(12) United States Patent
Murakami et al.

(10) Patent No.: US 11,407,374 B2
(45) Date of Patent: Aug. 9, 2022

(54) PROCESSING DEVICE, PROCESSING METHOD, AND PROGRAM FOR AT LEAST ONE OF CONTROLLING A TRAVELING STATE OF A MOVABLE OBJECT DEPENDING ON USE INFORMATION OF A FIRST TRAINING DEVICE AND RESTRICTING USE STATES OF ONE OR MORE TRAINING DEVICES DEPENDING ON THE TRAVELING STATE OF THE MOVABLE OBJECT

(71) Applicant: TOYOTA JIDOSHA KABUSHIKI KAISHA, Toyota (JP)

(72) Inventors: Kunihiro Murakami, Okazaki (JP); Katsuhiko Sakakibara, Kariya (JP); Makoto Matsushita, Ichinomiya (JP); Junya Sato, Nagoya (JP); Kiyonori Yoshida, Toyota (JP); Tae Sugimura, Miyoshi (JP); Takashi Hayashi, Aichi-gun (JP); Jun Endo, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 325 days.

(21) Appl. No.: 16/691,662

(22) Filed: Nov. 22, 2019

(65) Prior Publication Data
US 2020/0223391 A1 Jul. 16, 2020

(30) Foreign Application Priority Data
Jan. 11, 2019 (JP) .............................. JP2019-003616

(51) Int. Cl.
*B60R 21/2338* (2011.01)
*B60R 21/015* (2006.01)
(Continued)

(52) U.S. Cl.
CPC .... *B60R 21/2338* (2013.01); *B60R 21/01542* (2014.10); *G01C 21/3641* (2013.01);
(Continued)

(58) Field of Classification Search
CPC ........ B60N 3/00; A52B 21/055; B62D 31/00; B62D 31/02; B62D 31/025; B62D 31/04;
(Continued)

(56) References Cited

U.S. PATENT DOCUMENTS

| | | | |
|---|---|---|---|
| 7,229,392 B2 * | 6/2007 | Turnbull ................ | A63B 21/04 482/129 |
| 9,776,042 B2 * | 10/2017 | Prokhorov ......... | A63B 22/0025 |
| 10,150,024 B1 * | 12/2018 | Esparza .................. | A63B 1/00 |

FOREIGN PATENT DOCUMENTS

| | | |
|---|---|---|
| JP | 9-183334 A | 7/1997 |
| JP | 2017-188086 A | 10/2017 |

* cited by examiner

*Primary Examiner* — Anthony R Jimenez
(74) *Attorney, Agent, or Firm* — Oblon, McClelland, Maier & Neustadt, L.L.P.

(57) ABSTRACT

A processing device includes a control unit configured to execute identifying a first training device that is of one or more training devices equipped in a movable object for providing a training opportunity to a passenger and that is used by the passenger, and at least one process of controlling a traveling state of the movable object depending on a content of a training using the first training device and restricting use states of the one or more training devices depending on the traveling state of the movable object.

10 Claims, 18 Drawing Sheets

(51) Int. Cl.
   *G01C 21/36*     (2006.01)
   *G05D 1/02*      (2020.01)
   *B60R 21/01*     (2006.01)
   *B60R 21/00*     (2006.01)
   *B60R 21/02*     (2006.01)

(52) U.S. Cl.
   CPC .... *G05D 1/0214* (2013.01); *B60R 2021/0032* (2013.01); *B60R 2021/01252* (2013.01); *B60R 2021/028* (2013.01); *B60R 2021/23384* (2013.01)

(58) Field of Classification Search
   CPC ...... B62D 63/00; B62D 63/02; B62D 63/025; B62D 63/04; B62D 47/00; B60P 9/00; B60P 3/14; B60P 3/42; B60P 3/205; A63B 21/02; A63B 24/00; A63B 24/0021; A63B 24/0075; A63B 24/0087; B60R 21/00; B60R 21/01; B60R 21/02; B60R 21/015; B60R 21/2338; G01C 21/36; G05D 1/02
   See application file for complete search history.

FIG. 7

OPERATION MANAGEMENT TABLE

| REGION ID | VEHICLE ID | USAGE TYPE | OPERATOR ID | BASE ID | CURRENT POSITION | OPERATION STATE |
|---|---|---|---|---|---|---|
| ... | ... | ... | ... | ... | ... | ... |
| D000A | S1001 | EXERCISE SUPPORT | aa | a1 | X1, Y1 | IN OPERATION |
| | ... | ... | ... | ... | ... | ... |
| | S2001 | PICKUP AND DELIVERY | | | | OUT OF OPERATION |
| ... | ... | ... | ... | ... | ... | ... |

FIG. 9

VEHICLE INFORMATION TABLE

| VEHICLE ID | OPERATOR ID | OPERATING HOURS | VEHICLE SIZE | CAPACITY | MOUNTED DEVICE | VEHICLE IMAGE |
|---|---|---|---|---|---|---|
| ... | ... | ... | ... | ... | ... | ... |
| S1001 | aa | 10:00-18:00 | W1, H1, D1 | ... | AEROBIC EXERCISE TYPE × 2 (TREADMILL, BIKE) MUSCLE STRENGTH TYPE × 1 (PEC DECK, LEG EXTENSION) | |
| ... | ... | ... | ... | ... | ... | ... |

FIG. 10

RESERVATION INFORMATION TABLE

| RESERVATION ID | USER ID | PLANNED GETTING-ON SPOT | PLANNED GETTING-ON DATE AND HOUR | PLANNED GETTING-OFF SPOT | PLANNED GETTING-OFF DATE AND HOUR | USE PURPOSE | PW | SERVICE STATE |
|---|---|---|---|---|---|---|---|---|
| ⋮ | ⋮ | ⋮ | ⋮ | ⋮ | ⋮ | ⋮ | ⋮ | NON-EXECUTION |
| R1002 | U2001 | ⋮ | 2018/12/ 18/09 :00 | ⋮ | 2018/12/ 18/10 :00 | ⋮ | ⋮ | IN EXECUTION |
| ⋮ | ⋮ | ⋮ | ⋮ | ⋮ | ⋮ | ⋮ | ⋮ | COMPLETION |

FIG. 12

DEVICE INFORMATION TABLE

| DEVICE ID | NAME | DISPOSED POSITION | ORIENTATION | LOCK MECHANISM | SAFETY DEVICE | MENU ITEM |
|---|---|---|---|---|---|---|
| M01 | TREADMILL | ... | FRONT-REAR | INCLUDED | OVERTURNING PREVENTION | ... |
| M02 | FITNESS BIKE | ... | FRONT-REAR | INCLUDED | OVERTURNING PREVENTION | ... |
| M03 | PEC DECK | ... | FRONT-REAR | INCLUDED | OVERTURNING PREVENTION | ... |

FIG. 13

USE STATE TABLE

| USER ID | HOUR | USE STATUS | SELECTION MENU | EXERCISE LOAD AMOUNT |
|---------|------|------------|----------------|----------------------|
| U2001 | 201812180911 | IN USE | : | : |
|  | 201812180910 | IN USE | : | : |
|  | ... | ... | ... | ... |
|  | ... | READY | — | — |

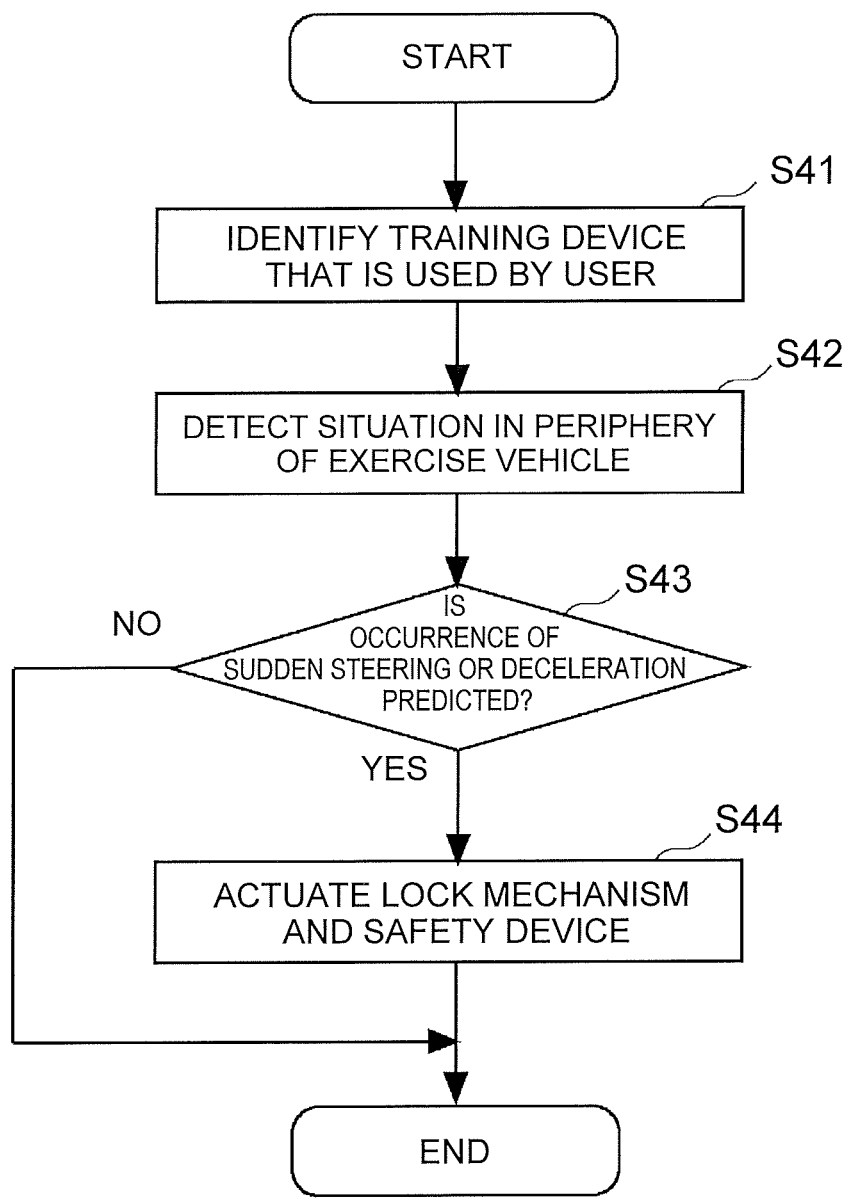

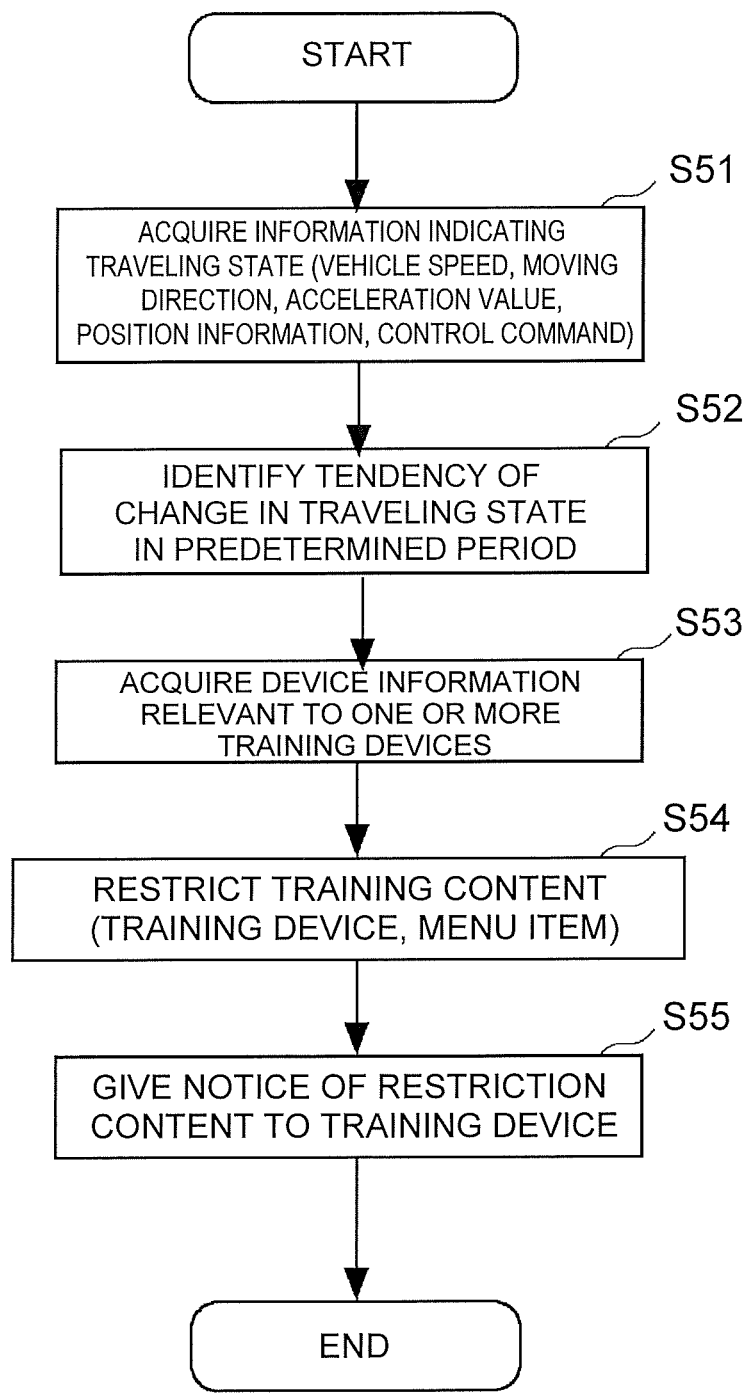

PROCESSING DEVICE, PROCESSING METHOD, AND PROGRAM FOR AT LEAST ONE OF CONTROLLING A TRAVELING STATE OF A MOVABLE OBJECT DEPENDING ON USE INFORMATION OF A FIRST TRAINING DEVICE AND RESTRICTING USE STATES OF ONE OR MORE TRAINING DEVICES DEPENDING ON THE TRAVELING STATE OF THE MOVABLE OBJECT

INCORPORATION BY REFERENCE

The disclosure of Japanese Patent Application No. 2019-003616 filed on Jan. 11, 2019 including the specification, drawings and abstract is incorporated herein by reference in its entirety.

BACKGROUND

1. Technical Field

The disclosure relates to a processing device, a processing method and a program.

2. Description of Related Art

In recent years, there has been researched provision of services by utilizing a movable object such as a vehicle that can perform autonomous traveling, for multiple purposes. As a kind of service, it is conceivable to use the space in the movable object, as a space in which a utilizing person performs predetermined work. For example, Japanese Patent Application Publication No. 9-183334 discloses a movable office configured by gathering a plurality of vehicles equipped with usable office equipment at a predetermined place and joining the plurality of vehicles to a connection vehicle.

SUMMARY

There can be a kind of service in which training equipment is equipped in the movable object and the space in the movable space is provided as a space allowing an indoor exercise mainly for health control such as daily physical strength training and diet. In the case where the training equipment is equipped in the movable object, there is a problem of securement of safety of a using person of the training equipment during traveling. The disclosure has an object to provide a technology allowing the securement of the safety of the user that performs training in the movable object during traveling.

An exemplary aspect of the disclosure is a processing device. The processing device includes a control unit configured to execute identifying a first training device that is of one or more training devices equipped in a movable object for providing a training opportunity to a passenger and that is used by the passenger, and at least one process of controlling a traveling state of the movable object depending on a content of a training using the first training device and restricting use states of the one or more training devices depending on the traveling state of the movable object.

An exemplary aspect of the disclosure is a processing method. The disclosure may be a processing method including performing identifying a first training device that is of one or more training devices equipped in a movable object for providing a training opportunity to a passenger and that is used by the passenger, and at least one process of controlling a traveling state of the movable object depending on a content of a training using the first training device and restricting use states of the one or more training devices depending on the traveling state of the movable object.

An exemplary aspect of the disclosure is a program that is executed by a computer. The disclosure may be a program that causes a computer to execute identifying a first training device that is of one or more training devices equipped in a movable object for providing a training opportunity to a passenger and that is used by the passenger, and at least one process of controlling a traveling state of the movable object depending on a content of a training using the first training device and restricting use states of the one or more training devices depending on the traveling state of the movable object, or may be a computer-readable storage medium in which the program is stored in a non-transitory manner.

With the disclosure, it is possible to provide a technology allowing the securement of the safety of the user that performs training in the movable object during traveling.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is a diagram showing an example of operation management information that is stored in a vehicle management DB;

FIG. 9 is a diagram showing an example of vehicle information that is stored in a vehicle information DB;

FIG. 10 is a diagram showing an example of reservation information that is stored in a reservation information DB;

FIG. 12 is a diagram showing an example of device information that is stored in a device information DB;

FIG. 13 is a diagram showing an example of use information that is stored in a use information DB;

FIG. 18 is a flowchart showing an example of a process of actuating a lock mechanism and the safety device of the training device during traveling; and FIG. 19 is a flowchart showing an example of a process that is executed in an exercise vehicle according to a first modification.

DETAILED DESCRIPTION OF EMBODIMENTS

An exercise support vehicle according to an embodiment is a movable object that can perform autonomous traveling and that has multiple functions. As such a movable object, for example, there is a vehicle including a facility or equipment such as a training device for providing an opportunity of a training using the vehicle space to a user, in the vehicle. The user of the exercise support vehicle can be said to be a utilizing person of an indoor excise service mainly for health control such as daily physical strength training and diet, or a using person that uses one or more training devices equipped in the vehicle. Furthermore, it can be said that the user is a passenger that rides in the exercise support vehicle.

The exercise support vehicle according to the embodiment is configured to identify a first training device that is of one or more training devices equipped in the movable object for providing the training opportunity to the passenger and that is used by the passenger. Then, the exercise support vehicle is configured to perform at least one process of controlling a traveling state of the movable object depending on a content of the training using the first training device and restricting use states of the one or more training devices depending on the traveling state of the movable object.

Because of this configuration, the exercise support vehicle can control the traveling state of the exercise support vehicle, depending on the type of the first training device, a menu item provided by the first training device, an exercise load amount and the like. Furthermore, the exercise support vehicle can restrict the use states of the one or more training devices, depending on the traveling state of the movable object. As a result, it is possible to secure safety of the user at the time of the training during traveling.

An embodiment will be described below with reference to the drawings. A configuration of the embodiment described below is an example, and modes for carrying out the disclosure is not limited to the configuration of the embodiment described below.

First Embodiment

System Outline

Figure 1:
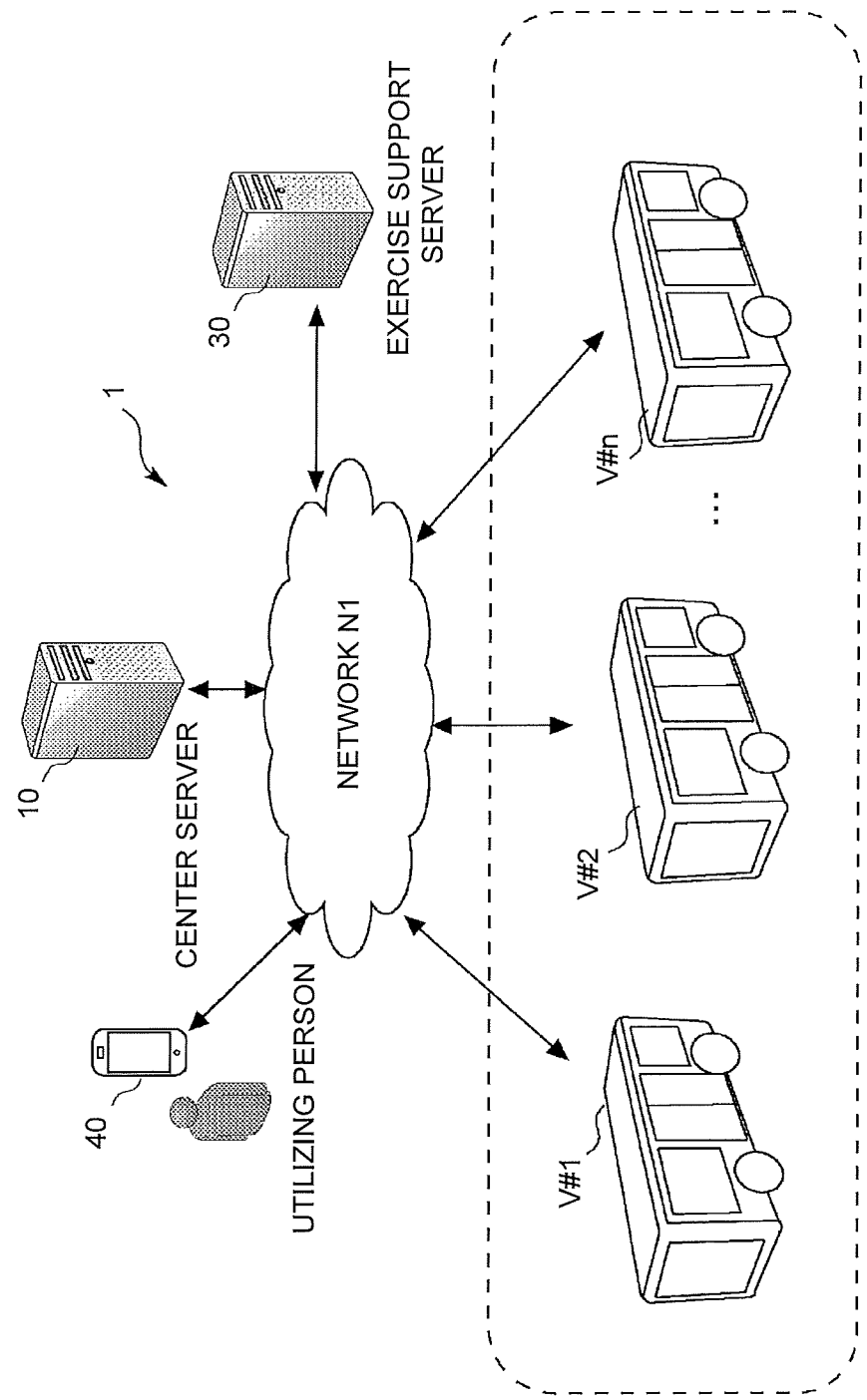
FIG. 1 is a diagram showing an example of a system configuration of an exercise support system according to a first embodiment.

FIG. 1 is a diagram showing an example of a system configuration of an exercise support system 1 according to a first embodiment. The exercise support system 1 in FIG. 1 functions as a part of a movable object system that provides services by utilizing a movable object such as a vehicle that can perform autonomous traveling, for multiple purposes, or as a complementary system that cooperates with the movable object system.

First, an outline of the movable system will be described. For example, the movable object system is configured to include a plurality of movable objects (V #1 to V #n) such as a vehicle that can perform the autonomous traveling on a road based on a given command, and a center server 10 that issues the command. Each movable object provides mobility services such as user movement, parcel transport, product sale and labor service, depending on various needs of a utilizing person (hereinafter, also referred to as a "user") with a user terminal 40 or an arbitrary utilizing person. Each movable object, the center server 10 and an exercise support server 30 are connected with each other through a network N1. Hereinafter, the movable object such as the vehicle that can perform the autonomous traveling is also referred to as merely a "vehicle", and the plurality of movable objects (V #1 to V #n) is also collectively referred to as a "vehicle V".

As the vehicle V, for example, there is a self-propelled electrically driven vehicle that is called an electric vehicle (EV) pallet. However, the vehicle V may be a vehicle that is operated by dynamic power of an internal combustion engine, as exemplified by a gasoline vehicle and a diesel vehicle, or may be a fuel cell vehicle (FCV) that is operated by electric power supplied from a fuel cell using hydrogen and the like. The vehicle V is a multipurpose movable object that allows change in exterior decoration and interior decoration of the vehicle V and selection of an arbitrary vehicle size depending on usage and purpose of the mobility service to be provided.

Figure 2:
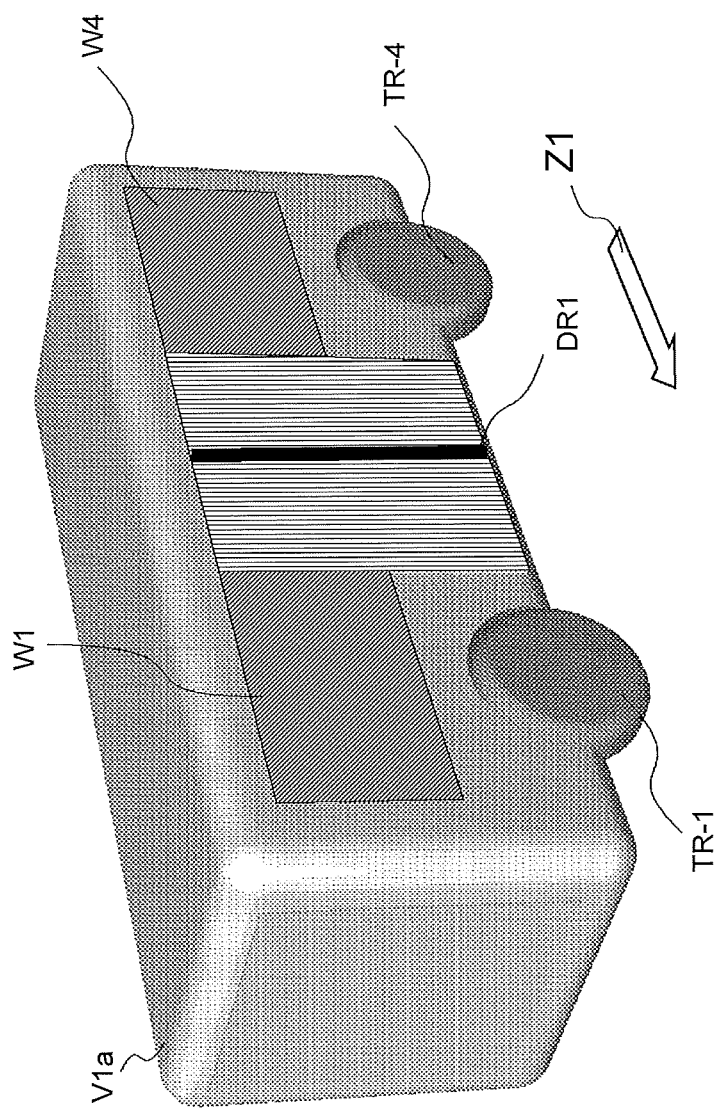
FIG. 2 is a perspective view showing an example of an external appearance of a vehicle.

FIG. 2 is a perspective view showing an example of an external appearance of the vehicle V. The vehicle V illustrated in FIG. 2 is an example of the movable object configured as an EV pallet. For example, the vehicle V as the EV pallet includes a box body V1a and four wheels TR1 to TR4 that are provided on both lateral sides of a lower portion of the body V1a and at a front portion and a rear portion in a moving direction. The four wheels TR1 to TR4 are joined to a drive shaft, and are driven by a drive motor that is a constituent element of a drive unit 23 illustrated in FIG. 11. Similarly, moving directions of the four wheels TR1 to TR4 during traveling are relatively changed by a steering motor included in a steering mechanism that is a constituent element of the drive unit 23, so that the moving direction of the vehicle V is controlled. In FIG. 2, as shown by an outlined arrow Z1, a vehicle direction that is an orientation of the vehicle V is a direction in which windows W1, W4 and a door DR1 for getting on and getting off the vehicle V are disposed on the left lateral surface of the body V1a.

Back to FIG. 1, the center server 10 is a device that manages a plurality of vehicles V constituting the movable object system, and gives an operation command to the vehicles in cooperation with the exercise support server 30. The vehicle V receives the operation command from the center server 10, creates an operation plan, and performs the autonomous traveling to a destination in accordance with the operation plan. The vehicle V includes acquisition means for acquiring position information (latitude, longitude and the like) about the vehicle V, and sends the position information acquired in a predetermined cycle, to the center server 10 and the exercise support server 30. The user terminal 40 is a small-scale computer that can be carried by the user, as exemplified by a smartphone, a tablet terminal and a wearable computer (a smartwatch and the like). The user terminal 40 may be a personal computer (PC) that is connected with the exercise support server 30 or the like through the network N1.

For example, the network N1 is a public network such as the Internet. The network N1 may include a wireless communication such as WiFi (R), a wireless network including a mobile telephone network such as LTE, LTE-Advanced and 3G, a dedicated network such as a virtual private network (VPN), and a network such as a local area network (LAN). In FIG. 1, one center server 10, one exercise support server 30, one user terminal 40, and a plurality of vehicles (V #1 to V #n) are representatively illustrated. A plurality of center servers 10, a plurality of exercise support servers 30 and a plurality of user terminals 40 can be connected to the network N1.

In the movable object system to which the exercise support system 1 according to the embodiment is applied, the vehicle V functions as a vehicle allowing an exercise support for providing, to the user, an indoor exercise service mainly for health control such as daily physical strength training and diet. Hereinafter, the vehicle V that can provide the indoor exercise service as the exercise support for the user is also referred to as an "exercise support vehicle 20" or an "exercise vehicle 20".

The exercise vehicle 20 includes a facility or equipment such as a training device for providing the opportunity of the training using the vehicle space to the user, in the vehicle. For example, the exercise vehicle 20 includes a training device for an aerobic exercise intended to increase cardio-respiratory endurance and to exert a fat combustion effect. Examples of such a training device include a treadmill and a fitness bike. Further, for example, the exercise vehicle 20 includes a training device for a muscle strength training intended to maintain good health and to prevent loss in muscle strength. The exercise vehicle 20 includes one or more training devices in the vehicle.

The exercise vehicle 20 may include a plurality of training devices constituted by a single kind of training device that can provide multiple types of exercises, or may include a plurality of training devices constituted by a single kind of training device that provides different types of exercises. Further, the exercise vehicle 20 may include a plurality of training devices that provide an identical type of exercise. The exercise vehicle 20 does not always need to be an unmanned vehicle, and a service staff, an instructor, a security staff or the like that provides the indoor exercise service may ride in the exercise vehicle 20. Further, the exercise vehicle 20 does not always need to be a vehicle that constantly performs the autonomous traveling. For example, depending on a situation, the staff may drive, or may assist driving.

The exercise support system 1 according to the embodiment is configured to include the exercise vehicle 20 that can provide the indoor exercise service, and the exercise support server 30. The exercise support server 30 manages the exercise vehicle 20, user information relevant to the user that uses the exercise vehicle 20, and reservation information relevant to reservation for the exercise vehicle 20. Identification information (vehicle ID) for uniquely identifying the exercise vehicle 20 is given to the exercise vehicle 20, and is held in a database. For example, the vehicle ID is a vehicle registration number (a number written on a number plate). For the user information and the reservation information, similarly, identification information (user ID) for identifying the user and identification information (reservation ID) for identifying the reservation are given and are held in the database.

For example, an application program (hereinafter, referred to as an "app") for registering the reservation of the use of the exercise vehicle 20 is installed in the user terminal 40. The user information is registered at the time when the app is installed. The user information includes the address, name, telephone number, sex, age, weight, height and others of the user. By the execution of the app implemented in the user terminal 40, the user registers the reservation information relevant to the reservation for the exercise vehicle 20 that provides the indoor exercise corresponding to the user's purpose, in the exercise support server 30. The reservation information includes a planned getting-on spot where the user gets on the exercise vehicle 20, a planned getting-on date and hour, a planned getting-off spot, a planned getting-off date and hour, and the like.

When the exercise support server 30 accepts the user information and reservation information given from the user terminal 40, the exercise support server 30 extracts exercise vehicles 20 fitting the reservation condition, from a database that manages the exercise vehicles 20, and gives a notice of the exercise vehicles 20, to the user terminal 40. From the exercise vehicles 20 given to the user terminal 40, the user decides the reservation for the use of an exercise vehicle 20 including a training device that allows an indoor exercise corresponding to the user's purpose. The user terminal 40, by the execution of the app, gives a notice of the decided exercise vehicle 20, to the exercise support server 30, so that the reservation for the exercise vehicle is completed. After the completion of the reservation, the exercise support server 30 registers the reservation information in the database, in association with the vehicle ID of the exercise vehicle 20. After the completion of the registration of the above information in the database, the exercise support server 30 sends a notice of the completion of the reservation, to the user terminal 40, together with the vehicle ID of the exercise vehicle 20.

The exercise vehicle 20 is used in an arbitrary way. For example, the user may perform the indoor exercise using the training device while the user moves from home to a destination such as a work place or a business trip destination, or may perform the indoor exercise after the user parks the exercise vehicle 20 at a destination such as a road or an open space where the exercise vehicle 20 may be parked. The user reserves an exercise vehicle 20 including an appropriate training device, depending on a movement date and hour and a movement section that are planned by the user, the exercise purpose, and the like, and thereby, can obtain a training opportunity using an idle time such as a movement time to a destination or the like.

Figure 3:
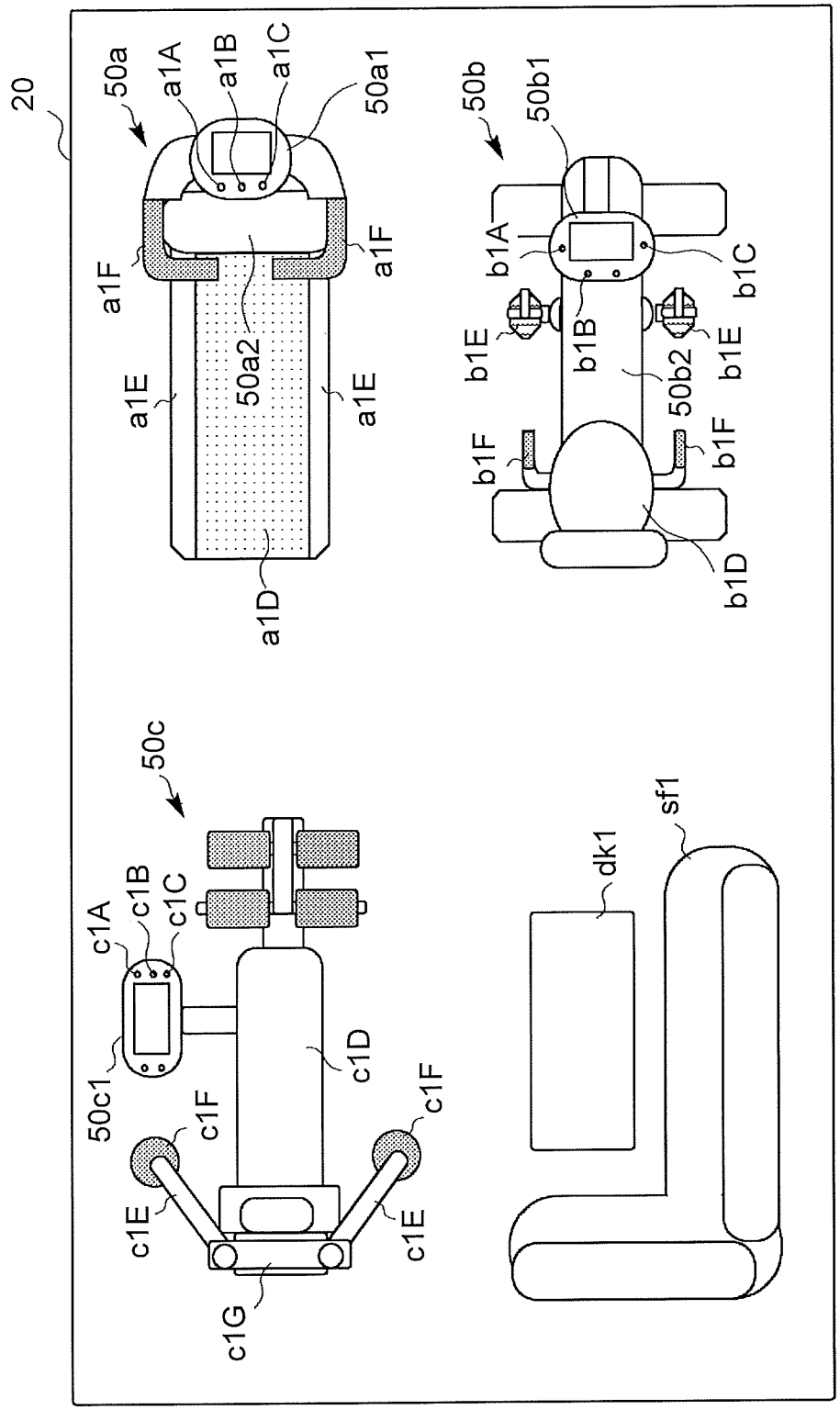
FIG. 3 is a diagram for describing a training device that is equipped in the vehicle.

FIG. 3 is a diagram for describing the training device that is equipped in the exercise vehicle 20. FIG. 3 illustrates a schematic plan view (a view of the interior of the vehicle as viewed from a roof side) of the interior of the vehicle in which a sofa sf1, a desk dk1 and a plurality of training devices 50a, 50b, and 50c are disposed. The training device 50a functions as a treadmill for an aerobic exercise. Further, the training device 50b functions as fitness bike for an aerobic exercise, and the training device 50c functions as a butterfly machine such as a pec deck for a muscle strength training. The training devices, the sofa sf1 and the desk dk1 are fixed to a floor surface of the exercise vehicle 20. The disposition of the training devices illustrated in FIG. 3 is an example in which the training devices are disposed parallel to a longitudinal direction of the box body V1a of the exercise vehicle 20. Hereinafter, the plurality of training devices (50a to 50c) equipped in the exercise vehicle is collectively referred to as a "training device 50".

The training device 50 equipped in the exercise vehicle includes a control device such as a microcomputer. The training device 50 has a function to communicate with an external device, and is connected with a control unit 24 that controls the traveling of the exercise vehicle, through an in-vehicle network (network N2), as described later. The in-vehicle network may be a wired network connected by a LAN cable or the like, or may be a wireless network connected by a short-distance wireless or the like. Identification information (device ID) for uniquely identifying the training device 50 is given to the training device 50. The device ID may be the media access control address (MAC address) of the training device 50.

For example, in accordance with a program stored in a memory of a microcomputer or the like, the training device 50 displays a menu list sectioned stepwise with respect to exercise load, on a display unit (50$a$1, 50$b$1, 50$c$1). The training device 50 controls the load amount of the exercise that is provided to the user, depending on a menu item selected from the menu by an operation input from the user. For example, the training device 50 controls the load amount of the exercise that is provided to the user, by increasing or decreasing a controlled variable of an electric motor, an actuator or the like built in the training device 50, in accordance with an instruction value from the microcomputer that is decided depending on the menu item.

For example, when the user uses the training device 50$a$ that functions as a treadmill, the user depresses a power-on button a1A on a panel surface of the display unit 50$a$1, and activates the training device 50$a$. After the power-on, a menu allowing selection of the exercise load is displayed on a display device (touch panel) of the display unit 50$a$1. For example, there is displayed a menu sectioned stepwise with respect to the exercise load such as "walking", "jogging", "light running (7 km/h)", "middle running (10 km/h)" and "hard running (13 km/h)". The user selects a menu item indicating an exercise intensity corresponding to the purpose, from the displayed menu, and depresses a start button a1B on the panel surface of the display unit 50$a$1, to start the exercise using the training device 50$a$.

For example, the training device 50$a$ controls a torque amount for driving an electric motor, depending on the menu item decided by the user. For example, an electric motor and drive mechanism for moving an endless belt a1D along a support frame a1E are equipped in the interior of a housing 50$a$2 of the training device 50$a$. The electric motor of the training device 50$a$ moves the endless belt a1D, in accordance with the controlled torque amount. The endless belt a1D moves along the support frame a1E, at a speed corresponding to the controlled torque amount. The user on the endless belt a1D can perform an aerobic exercise such as walking, jogging or running, on the moving endless belt a1D, while holding a pair of handrail frames a1F or without holding the frames a1F. The movement of the endless belt a1D is stopped by depressing a stop button a1C on the panel surface of the display unit 50$a$1.

The same operation as the training device 50$a$ is performed for the training device 50$b$ that functions as a fitness bike and the training device 50$c$ that functions as a butterfly machine. The training device 50$b$ includes a display unit 50$b$1 that is equipped with a power-on button b1A, a start button b1B and a stop button b1C on a panel surface. The training device 50$c$ includes a display unit 50$c$1 that is equipped with a power-on button c1A, a start button c1B and a stop button c1C on a panel surface. The user depresses the power-on button (b1A, c1A) on each display unit, and thereby activates the training device (50$b$, 50$c$). Then, the user selects a menu item indicating an exercise intensity corresponding to the purpose, from a menu displayed on the display unit, and depresses the start button (b1B, c1B), to start the exercise using the training device. Further, the user stops the exercise using the training device, by depressing the stop button (b1C, c1C).

In the training device 50$b$, for example, a load mechanism that performs a multistep electromagnetic control of rotational resistance (exercise load) of a rotation body to work with a pedal b1E is equipped in the interior of a housing 50$b$2. The training device 50$b$ controls a load amount that is given to the pedal b1E by the load mechanism, depending on a menu item for a content selected by the user. The user sits on a seat b1D of the training device 50$b$, and rotates a pair of pedals b1E by bending and stretching both legs alternately while restraining swaying of the posture with a pair of handlebars b1F. Thereby, the user can perform an aerobic exercise by bike training.

In the training device 50$c$, for example, a drive mechanism that works with a rotation shaft of an arm c1E and an electric actuator that performs a multistep control of rotational resistance (exercise load) of the rotation shaft are equipped in the interior of a support frame c1G. The training device 50$c$ controls a load amount relevant to turning of the art c1E, depending on a menu item for a content selected by the user. The user sits on a seat c1D of the training device 50$c$, causes the forearms to contact with arm pads c1F, and turns a pair of arms c1E to a front side. Thereby, the user can performs a muscle strength training intended for increasing a muscle such as a greater pectoral muscle and preventing loss in muscle strength.

In the embodiment, a lock mechanism for securing safety of the user that is using the training device 50 included in the exercise vehicle is equipped in the training device 50. Further, the training device 50 includes a safety device for preventing overturning of the user that is using the training device 50 and dive of the user from the seats b1D, c1D. Actions of the lock mechanism and the safety device are controlled through the microcomputer.

For example, in a state where the lock mechanism is actuated, the training device 50$a$ stops the electric motor that is operating for moving the endless belt a1D. The user that is using the training device 50$a$ can keep the posture for securing safety on the stopped endless belt a1D. Similarly, for example, the training device 50$b$ keeps the load amount that is given to the pedal b1E, and prohibits the rotation of the pedal b1E in the reverse direction. The user that is using the training device 50$a$ can keep a state where the user sits on the seat b1D during exercise, for securing safety. Further, the user that is using the training device 50$c$ can keep the posture during exercise, for securing safety. In the training device 50$c$, for example, the arms c1E become a stop state, at positions after turning. The state of the actuated lock mechanism of each training device is unlocked, for example, by an operation input to an operation part indicating unlocking of the lock mechanism that is displayed in the display device of the display unit.

Figure 4:
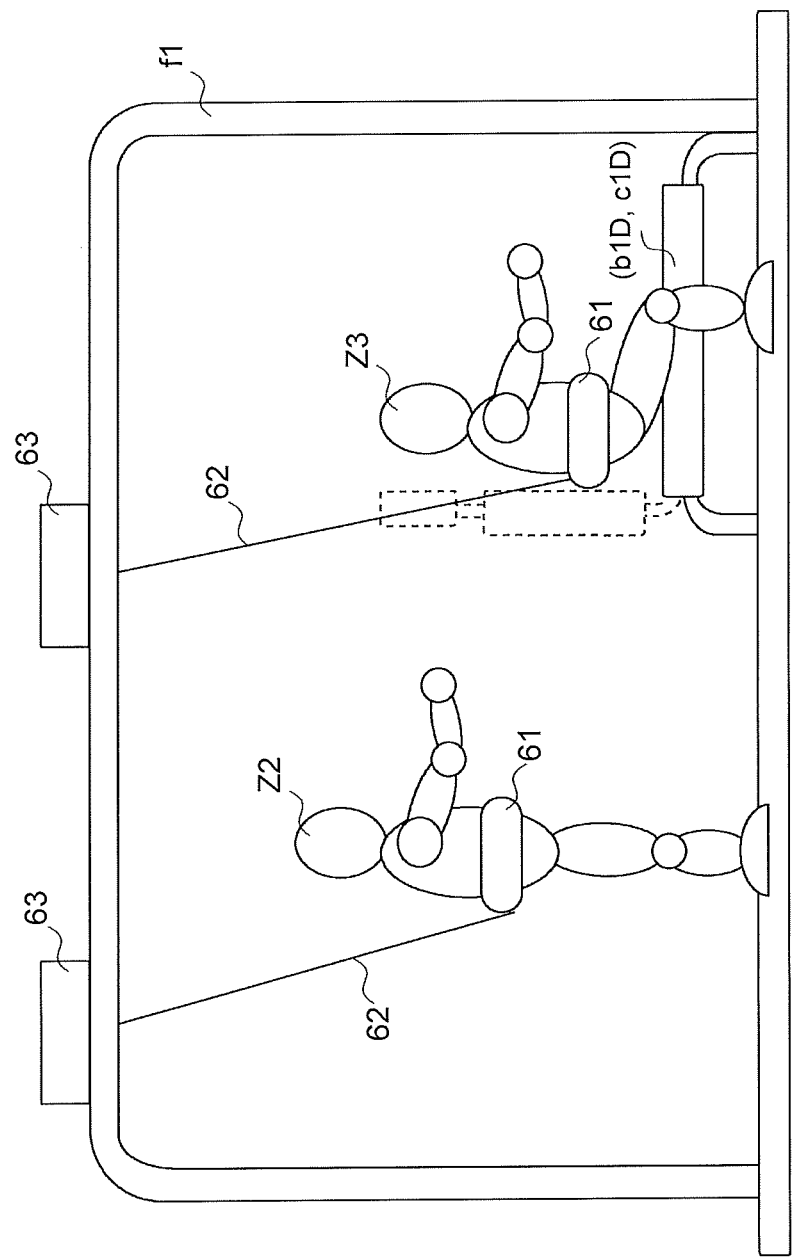
FIG. 4 is a diagram for describing a safety device of the training device.

FIG. 4 is a diagram for describing the safety device of the training device 50. FIG. 4 illustrates a schematic lateral view (a view from a right lateral side of the user) in a state where the user wears the safety device of the training device 50. For example, a user Z2 is using the training device in a standing posture (for example, running), and a user Z3 is using the training device in a sitting posture (for example, bike training or weight training).

As shown in FIG. 4, each training device 50 is equipped in the exercise vehicle, so as to be surrounded by a frame fl. The frame fl is fixed to the floor surface of the exercise vehicle 20, and supports a harness pulling unit 63 at an upper rear portion of the user (Z2, Z3) that uses the training device 50.

The training device 50 includes a safety device mainly constituted by a brace 61, a harness wire 62 and the harness pulling unit 63. The brace 61 is a belt to be wrapped around a waist portion of the user (Z2, Z3) that uses the training device 50, and is fixed to the waist portion of the user by a hook-and-loop fastener or the like. The brace 61 is joined to one end of the harness wire 62.

The harness wire 62 is a hoisting accessory in which the other end is joined to a wind-up mechanism of the harness pulling unit 63. The harness pulling unit 63 functions as a drive device that rolls up or rolls down the harness wire 62. The wind-up mechanism of the harness pulling unit 63 winds up or winds down the harness wire 62, by turning on or turning off a motor built in the wind-up mechanism. By the actuation of the safety device, the training device 50 equipped in the exercise vehicle can support the upper body of the user and stabilize the posture, when the user that is using the training device is about to overturn or to dive from the seat.

In addition to the above functions, the exercise vehicle 20 according to the embodiment periodically acquires use information indicating a state of use of the training device 50 equipped in the vehicle. The use information includes a power supply status indicating whether the training device is activated, a use status indicating whether the training device is being used, a menu item selected by the user, the current load amount (a controlled variable for the motor or the like) of the exercise using the training device 50. The exercise vehicle 20 holds the use information acquired from the training device 50, in the database, in association with acquired hour information and the device ID.

Based on the use information, the exercise vehicle 20 according to the embodiment identifies the training device 50 that is being currently used by the user, from the one or more training devices 50 equipped in the vehicle. Then, the exercise vehicle 20 controls the traveling state of the exercise vehicle 20, depending on the content (the menu item and exercise load amount) of the training using the training device 50. The exercise support system 1 in the embodiment can control the traveling state of the exercise vehicle 20, depending on the training content of the user that uses the training device 50, and therefore, it is possible to secure the safety of the user at the time of the training during movement.

Figure 5:
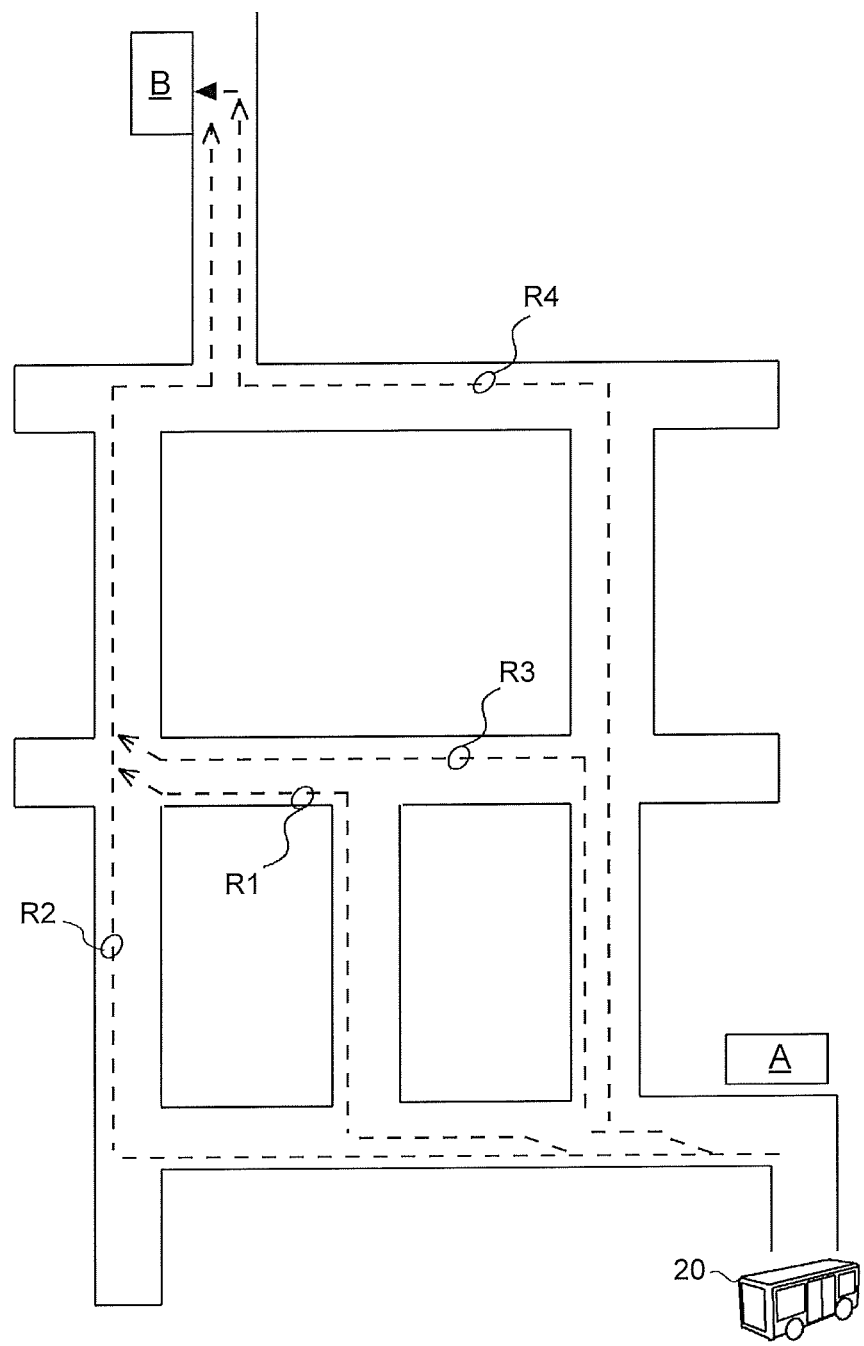
FIG. 5 is a diagram for describing a control of a traveling state.

FIG. 5 is a diagram for describing a control of the traveling state. In FIG. 5, a spot A and a spot B are respectively a planned getting-on spot and a planned getting-off spot that are registered in the exercise support server 30 as the reservation information about the exercise vehicle 20. Suppose that the user that uses the exercise vehicle 20 uses the training opportunity of the indoor exercise that is provided by the exercise vehicle, using the time for the movement from the spot A to the spot B. Further, suppose that the user gets on the exercise vehicle 20 at the spot A and the exercise vehicle 20 moves to the spot B by traveling along a planned route R1.

The exercise vehicle 20 identifies the use of the training device 50 by the user having got in the vehicle. The use of the training device 50 is identified based on the use information acquired through the in-vehicle network. Then, for example, the exercise vehicle 20 restricts a speed change amount and steering amount during the movement along the route R1, to equal to or smaller than predetermined thresholds. In the exercise vehicle 20, since the speed change amount and steering amount due to acceleration or deceleration at the time of a right or left turn or at the time of a start or stop at a traffic light are restricted to equal to or smaller than the thresholds, it is possible to secure the stability of the posture of the user that uses the training device 50.

The exercise vehicle 20 restricts the traveling speed during the traveling along the route R1, depending on the type of the training device 50 for which the use is identified. For example, in an indoor exercise (for example, jogging, running or the like) to be performed in the standing posture, the position of the center of gravity at the time of the exercise is higher than in an indoor exercise (for example, bike training, weight training or the like) to be performed in the sitting posture. Therefore, it can be said that the indoor exercise to be performed in the standing posture has a relatively lower stability than the indoor exercise to be performed in the sitting posture, in the exercise vehicle 20 during traveling.

Based on the use information, the exercise vehicle 20 identifies the use of the training device 50 that provides an aerobic exercise to be performed in the standing posture, as exemplified by jogging and running. Then, the exercise vehicle 20 decreases the traveling speed (for example, a legal speed) of the exercise vehicle 20, to a setting speed (a restricted speed, for example, 30 km/h) allowing the securement of the stability of the user that is performing the exercise in the standing posture. The restricted speed value can be previously held in a memory or the like, depending on the type of the indoor exercise that is provided by the training device 50 equipped in the exercise vehicle 20. In the exercise vehicle 20, since the traveling speed can be restricted depending on the type of the training device 50, it is possible to secure the safety of the user that performs the exercise using the training device.

The exercise vehicle 20 may restrict the traveling speed, depending on the menu item selected from the menu that is provided by the training device 50 and the exercise load amount. For example, it is thought that the bike training in which the user bends and stretches both legs alternately in the sitting posture has a relatively lower stability than the weight training for the upper half of the body that is performed while both feet are put on the floor surface in the vehicle. Further, in each training, it can be said that the securement of the stability of the posture becomes difficult depending on the exercise intensity (exercise load amount) in the content indicated by the selected menu item.

Based on the use information, the exercise vehicle 20 identifies the menu item selected by the user, and the current exercise load amount. Then, in the same way as the above, the exercise vehicle 20 sets the traveling speed of the exercise vehicle 20, to a traveling speed allowing the securement of the stability of the user during the exercise, depending on the menu item selected by the user and the current exercise load amount. In the exercise vehicle 20, since the traveling speed can be restricted depending on the selected menu item and the exercise intensity, it is possible to secure the safety of the user during traveling.

Further, the exercise vehicle 20 may prohibit the use of the training device 50 and the selection of a particular menu item in the menu provided by the training device, based on the information about a route along which the exercise vehicle 20 plans to travel.

For example, when the exercise vehicle 20 travels along the route R1 to move to the spot B as the destination, five right or left turns, in total, are planned from the spot A as the getting-on spot. Therefore, in the case where a plurality of training devices 50 is disposed in the vehicle along the moving direction as shown in FIG. 3, a lateral load is applied to the user during exercise, whenever the exercise vehicle 20 turns right or left on the route. The user during exercise can lose the posture by unexpectedly receiving the lateral load at the time of the right or left turn.

For example, the exercise vehicle 20 acquires information about the planned traveling route when the exercise vehicle 20 moves from the spot A to the spot B. Then, based on the route information, the exercise vehicle 20 identifies a training device 50 that is of the plurality of training devices 50 equipped in the vehicle and for which the securement of the safety is difficult, and the menu item for each training device 50. The exercise vehicle 20 prohibits the use of the identified training device 50 and the selection of the identified menu item. The prohibition condition may be previously held in the memory or the like, depending on the training device 50 equipped with the exercise vehicle 20 and the type of the indoor exercise that is provided by the training device 50. In the exercise vehicle 20, it is possible to restrain the traveling route from influencing instability of the posture.

During traveling, there is concern of a sudden steering or deceleration for avoiding collision with an obstacle. When an unexpected steering or deceleration occurs for the user during exercise, the exercise vehicle 20 actuates the lock mechanism and safety device equipped in the training device 50. For example, the exercise vehicle 20 gives an instruction to actuate the lock mechanism and the safety device, to the training device 50 connected to the in-vehicle network. The microcomputer of the training device 50 receives the instruction from the exercise vehicle 20, and actuates the lock mechanism and safety device of the training device 50. By actuating the lock mechanism and safety device equipped in the training device 50, it is possible to secure the safety of the user at the time of the training during traveling, when an unexpected steering or deceleration occurs.

Furthermore, for the route for the movement from the spot A to the spot B, the exercise vehicle 20 may change the route along which the exercise vehicle 20 travels, based on the menu item for which the user is performing exercise. In the example of FIG. 5, the exercise vehicle 20 can select one of routes R2 to R4 along which the exercise vehicle 20 can travel and that is other than the route R1, and can change the route for the movement from the spot A to the spot B, to the selected route, as an alternate route based on the menu item.

For example, suppose that the training device 50 that is being used by the user is the training device 50a to function as the treadmill shown in FIG. 3 and the user is performing the aerobic exercise at an exercise intensity of "hard running (13 km/h)". As described already, in the exercise to be performed in the standing posture, the position of the center of gravity is higher, and therefore, the stability of the posture is relatively lower. Furthermore, the exercise intensity of the selected menu item is relatively higher than other exercises to be performed in the standing posture. Therefore, it can be said that the user that is running at the above exercise intensity is weak against an unexpected load (sudden steering or deceleration) to be generated in the exercise vehicle 20 during traveling.

When the exercise vehicle 20 identifies the menu item in use based on the use information acquired from the training device 50a, the exercise vehicle 20 refers to map data, and selects an alternate route that is of the routes from the spot A to the spot B, that is suitable for the exercise content of the menu item, and that is other than the route R1. For example, the exercise vehicle 20 adopts a condition that the number of right or left turns is relatively small, for decreasing the number of loads to be applied to the user during exercise, and adopts a condition that the distance of a straight road is relatively long, for continuing a stable running. Based on the conditions, the exercise vehicle 20 can select the route R2 or the route R4 as an alternate route. The selection condition for the alternate route may be previously held in the memory or the like, depending on the training device 50 and the menu item of the training device 50. For the other training devices 50, the exercise vehicle 20 identifies the alternate route, similarly. In the case where there is a plurality of alternate roads, the exercise vehicle 20 may identify the alternate route along which the exercise vehicle 20 travels, from the plurality of alternate routes, in consideration of road condition or movement distance. For example, the road condition can be acquired by road-vehicle communication or the like. Based on the menu item in use, the exercise vehicle 20 can select a safe alternate route suitable for the exercise content indicated by the menu item.

Functional Configuration

Next, functional configurations of the center server 10, the exercise vehicle 20 and the exercise support server 30 (hereinafter, also referred to as merely a "server 30") of the exercise support system 1 according to the embodiment will be described with reference to FIG. 6 to FIG. 13. As described already, the center server 10 is a server device that manages a plurality of vehicles V constituting the movable object system and that gives the operation command to the vehicles V. The exercise vehicle 20 will be mainly described below.

Center Server

Figure 6:
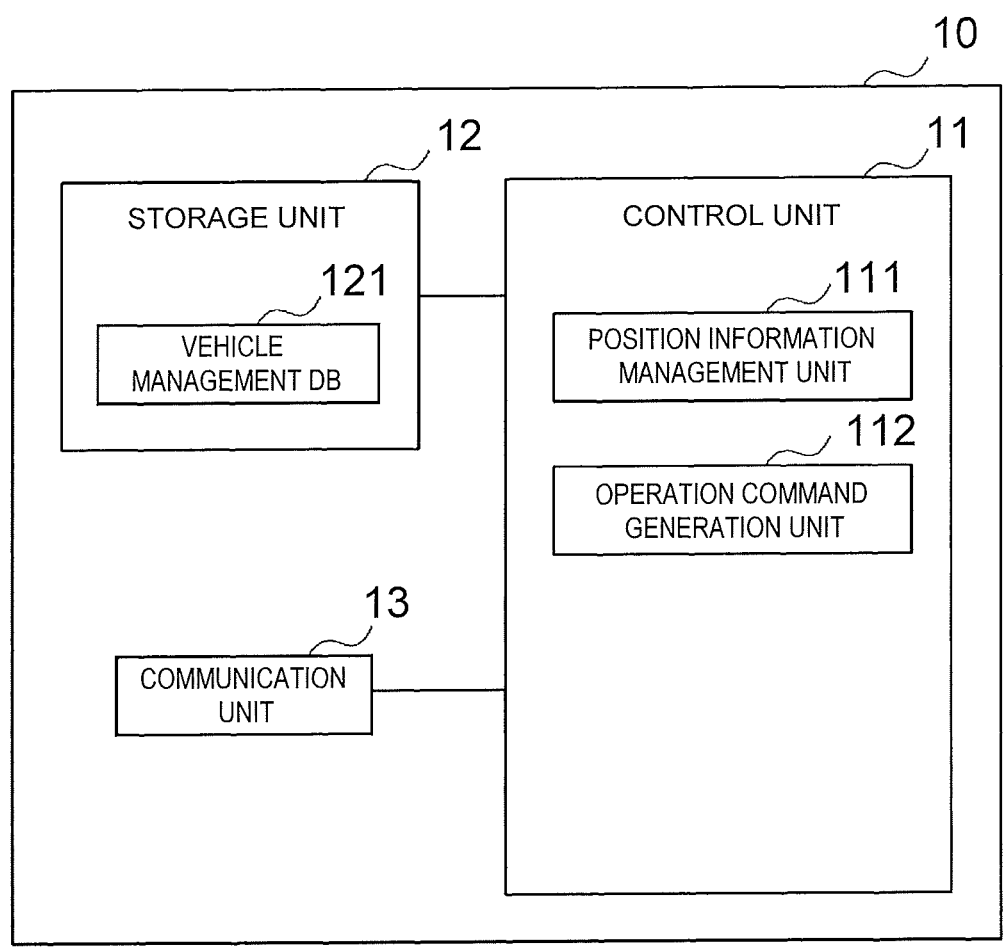
FIG. 6 is a diagram showing an example of a functional configuration of a center server.

FIG. 6 is a diagram showing an example of the functional configuration of the center server 10. The center server 10 is configured to include a control unit 11, a storage unit 12 and a communication unit 13, as functional constituent elements. The communication unit 13 is a communication interface for the network N1. For example, the communication unit 13 includes a LAN interface board and a wireless communication circuit for wireless communication. In the exercise support system 1, the center server 10 manages the autonomous traveling of the plurality of exercise vehicles 20, in cooperation with the server 30, and generates the operation command to the exercise vehicles.

For example, the center server 10 is a general-purpose computer that includes a processor, a main storage device and an auxiliary storage device. The processor includes a central processing unit (CPU), a digital signal processor (DSP), a graphics processing unit (GPU), and the like. The main storage device includes a flash memory, a random access memory (RAM), a read only memory (ROM), and the like. The auxiliary storage device is a non-volatile storage device that stores therein a variety of programs including an operating system (OS) and a variety of data in a recording medium in a readable and writable manner. The OS includes a communication interface program that performs transfer of data with an external device or the like to be connected through the communication unit 13. Examples of the auxiliary storage device include a portable recording medium, a flash memory, a hard disk drive (HDD) and a solid state drive (SSD). For example, the portable recording medium is a universal serial bus (USB) memory, or a disc recording medium such as a compact disc (CD), a digital versatile disc or a Blu-ray (R) disc. The processor executes a computer program expanded in a workspace of the main storage device in an executable manner, and controls the whole of the center server 10. The processor controls peripheral equipment by executing the computer program, and thereby, provides functions appropriate for predetermined purposes as described later. Here, some functions may be provided as hardware circuits such as an application specific integrated circuit (ASIC), a field-programmable gate array (FPGA), a numerical processor and an image processing processor. The center server 10 may be constituted by a single computer, or may be constituted by a plurality of computers that cooperate with each other.

The control unit 11 is an information processing function that is provided by the execution of the computer program by the processor. Through the control unit 11, there is provided an information processing function to manage the autonomous traveling of the plurality of exercise vehicles 20 and to generate the operation command to be sent to the exercise vehicles. The control unit 11 includes at least a position information management unit 111 and an operation command generation unit 112. A series of processes to be executed in the center server 10 may be executed by software, or may be executed by hardware.

The position information management unit 111 collects the position information (for example, latitude and longitude) from vehicles V (including the plurality of exercise vehicles 20) under the management by the center server 10, and manages the position information. The position information management unit 111 receives the current position information sent from the vehicle V, periodically or in response to a request from the center server 10, and stores the position information in a vehicle management DB 121 constructed in the storage unit 12.

In cooperation with the server 30, the operation command generation unit 112 generates an operation command relevant to the exercise vehicle 20 that provides the training opportunity. For example, the operation command generation unit 112 generates an operation command relevant to the operation on a route in a predetermined region where the service of the exercise vehicle 20 is provided and the movement between a departure spot (planned getting-on spot) and a destination spot (planned getting-off spot) that are designated by the user.

The operation command generation unit 112 acquires the position information about the exercise vehicle 20. Then, for example, the operation command generation unit 112 refers to the map data stored in the auxiliary storage device or the like, and identifies a movement route from the current position of the exercise vehicle 20 as the departure spot to the destination spot. Then, the operation command generation unit 112 generates an operation command to travel along the identified movement route and reach the destination spot. The operation command includes instructions such as "stopping for a while" and "causing the user to get on or get off the exercise vehicle 20".

The storage unit 12 is configured to include a main storage device and an auxiliary storage device. In the storage unit 12, the vehicle management database (DB) 121 that manages the operation information relevant to the operation of the vehicles V (including the plurality of exercise vehicles 20) constituting the movable object system is constructed. For example, the vehicle management DB 121 is a relational database for which a program of a database management system (DBMS) to be executed by a processor manages data stored in the auxiliary storage device or the like.

FIG. 7 is a diagram showing an example of operation management information that is stored in the vehicle management DB 121. As illustrated in FIG. 7, the operation management information is managed as an operation management table. For information that is registered in the operation management table, a field can be added, changed or removed when appropriate.

In FIG. 7, the operation management table has fields of region ID, vehicle ID, usage type, operator ID, base ID, current position and operation state. In the region ID, information (region ID) indicating a region where the vehicle V provides the service is stored. For example, the region ID is regional mesh information (a standardized regional mesh code, a divided regional mesh code, or the like). The information to be stored in the region ID may be information indicating a city, a ward, a town, a village or the like, or may be information indicating each of a latitude and longitude identifying the region where the vehicle provides the service.

In the vehicle ID, identification information (vehicle ID) for uniquely identifying the vehicle V that is managed by the center server 10 is stored. For example, the vehicle ID is a vehicle registration number (a number written on a number plate). In the usage type, information for identifying the usage type of the service to be provided by the vehicle is stored. For example, in the case of the exercise vehicle 20 for providing the training opportunity of the indoor exercise, "exercise support" is stored. In the case of the vehicle V that provides a movement service to the user, "passenger transportation" is stored. In the case of the vehicle V that provides a parcel pickup and delivery service to the user, "pickup and delivery" is stored.

In the operator ID, identification information (operator ID) for uniquely identifying an operator that provides various services using the vehicle V is stored. For example, the operator ID is a business operator code that is assigned to the operator. In the base ID, information (for example, address, or latitude and longitude) indicating a place that is a base for the vehicle V is stored. The vehicle V departs from a base place identified by the base ID, and returns to the base place after the completion of the service provision in a region designated by the region ID. In the current position, the position information (for example, latitude and longitude) indicating the current position of the vehicle V is stored. The position information is updated when the center server 10 receives the position information sent from the vehicle V. The position information can include identification information (for example, link number) about a road where the vehicle V is positioned, identification information (for example, node number) about an intersection or the like, address and the like. In the operation state, status information indicating the operation state of the vehicle V is stored. For example, in the case where the vehicle V is providing the movement service while performing the autonomous traveling, information indicating "in operation" is stored, and in the case where the vehicle V is not providing the movement service, information indicating "out of operation" is stored.

Exercise Support Server

Figure 8:
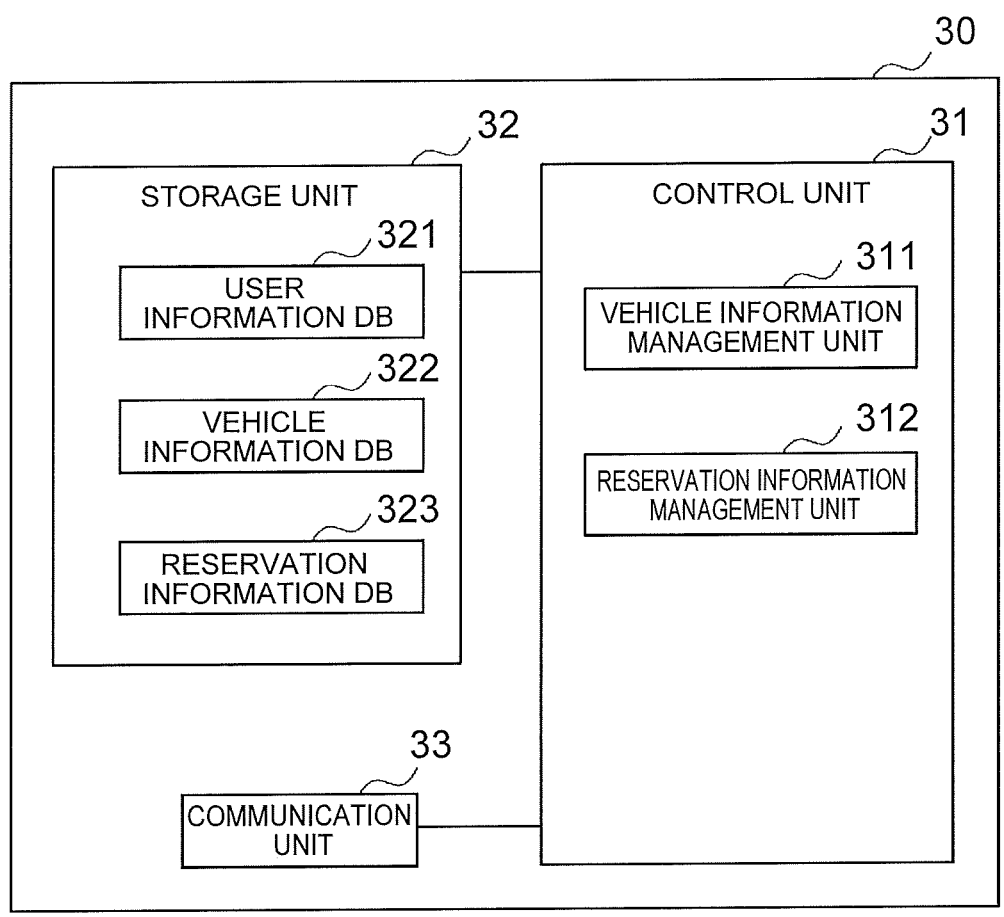
FIG. 8 is a diagram showing an example of a functional configuration of an exercise support server.

The server (exercise support server) 30 will be described with reference to FIG. 8. FIG. 8 is a diagram showing an example of the functional configuration of the server 30. The server 30 is configured to include a control unit 31, a storage unit 32 and a communication unit 33, as functional constituent elements. The communication unit 33 is the same as the communication unit 13 of the center server 10, and therefore, the description of the communication unit 33 is omitted.

Similarly to the center server 10, the server 30 is a general-purpose computer that includes a processor, a main storage device and an auxiliary storage device. The above constituent elements of the server 30 are the same as the constituent elements of the center server 10, and therefore, the description of the above constituent elements is omitted. The server 30 may be constituted by a single computer, or may be a system constituted by an aggregation of a plurality of computers, as exemplified by a cloud. For example, the server 30 reads and executes an OS, a variety of programs and a variety of tables that are stored in an auxiliary storage device, in the workspace of a main storage device. By the execution of the programs, the server 30 controls constituent units described below, and thereby, provides functions appropriate for predetermined purposes.

The main storage device and the auxiliary storage device that are included in the server 30 constitute the storage unit 32. In the storage unit 32, a user information DB 321, a vehicle information DB 322 and a reservation information DB 323 are constructed. For example, each of the DBs is a relational database for which a program of a database management system (DBMS) to be executed by a processor of the server 30 manages data stored in the auxiliary storage device or the like.

The control unit 31 is an information processing function that is provided by the execution of a computer program by a processor of the server 30. The control unit 31 includes at least a vehicle information management unit 311 and a reservation information management unit 312, as constituent units. Through the control unit 31, there is an information processing function to manage the exercise vehicle 20 including one or more training devices 50 in the vehicle and to reserve the exercise vehicle 20. A series of processes to be executed in the server 30 may be executed by software, or may be executed by hardware.

The vehicle information management unit 311 manages vehicle information about the exercise vehicle 20. For example, the vehicle information management unit 311 extracts the vehicle ID of the exercise vehicle 20 that provides the training opportunity of the indoor exercise as a service, from the center server 10 that cooperates with the server 30. Then, using the extracted vehicle ID as a destination, the vehicle information management unit 311 requests a notice of the vehicle information, to the exercise vehicle 20 to which the vehicle ID is given. In answer to the request of the notice of the vehicle information from the server 30, the exercise vehicle 20 connected to the network N1 acquires the vehicle information held in a storage unit 27 of the exercise vehicle 20, and makes a response of the vehicle information to the server 30. The vehicle information management unit 311 acquires the response to the notice request of the vehicle information, and stores in the vehicle information DB 322, in association with the vehicle ID.

FIG. 9 is a diagram showing an example of the vehicle information that is stored in the vehicle information DB 322. As illustrated in FIG. 9, the vehicle information acquired from the exercise vehicle is managed as a vehicle information table. For example, the vehicle information table illustrated in FIG. 9 is managed for each region ID that can be provided by the indoor exercise service. For information that is registered in the vehicle information table, a field can be added, changed or removed when appropriate.

In FIG. 9, the vehicle information table has fields of vehicle ID, operator ID, operating hours, vehicle size, capacity, mounted device and vehicle image. Information that is stored in the fields of the vehicle ID and the operator ID is the same as that in FIG. 7, and therefore, the description of the information is omitted. In the operating hours, information indicating a service start hour and service end hour of the exercise support service that is provided in the exercise vehicle is stored. In the vehicle size, information indicating the size (width (W), height (H), depth (D)) of the exercise vehicle is stored. In the capacity, information indicating the number of persons that can ride in the exercise vehicle is stored.

In the mounted device, information indicating the number of training devices 50 equipped in the exercise vehicle 20 and the training content is stored. FIG. 9 illustrates two training devices (a treadmill and a fitness bike) that provide the aerobic exercise, and one training device (a pec deck and a leg extension) that provides a plurality of muscle strength trainings. In the vehicle image, information indicating an image of an external appearance of the exercise vehicle 20 identified by the vehicle ID and an image of training equipment equipped in the vehicle is stored. For example, the image information to be stored in the vehicle image is provided by an operator that operates the exercise vehicle.

Back to FIG. 8, the reservation information management unit 312 manages the user information accepted at the time of the install of the app. The user information is managed in the user information DB 321. The reservation information management unit 312 gives the identification information (user ID) for uniquely identifying the user, at the time of the install of the app in the user terminal 40. Then, the reservation information management unit 312 registers the accepted user information in the user information DB 321, in association with the user ID. The user information includes personal information such as the address, name and telephone number of the user and attribute information indicating attributes such as age, sex, occupation, weight and height.

The reservation information management unit 312 manages the reservation information relevant to the exercise vehicle 20 for which the reservation is fixed. The reservation information relevant to the exercise vehicle 20 is managed in the reservation information DB 323. For example, the reservation information management unit 312 accepts the reservation information relevant to the reservation of the exercise vehicle 20 allowing the indoor exercise intended by the user, by the execution of the app implemented in the user terminal 40. The reservation information includes the planned getting-on spot where the user gets on the exercise vehicle 20, the planned getting-on date and hour, the planned getting-off spot, the planned getting-off date and hour, and information indicating an exercise purpose.

The reservation information management unit 312 refers to the vehicle information DB 322, and extracts the exercise vehicle 20 with the vehicle ID that includes the planned getting-on spot or the planned getting-off spot in the region ID. A list of the extracted exercise vehicles 20 is given to the user terminal 40, together with information such as the vehicle ID, the operating hours, the vehicle size, the mounted device and the vehicle image.

By the execution of the app, the list of the exercise vehicles 20 given from the server 30 is displayed on a display device of the user terminal 40. By operating the user terminal 40, the user identifies the exercise vehicle 20 including the training device that allows the indoor exercise corresponding to the user's purpose, from the list of the exercise vehicles 20 displayed on the display device. The user terminal 40 accepts an operation input by the user, and sends the exercise vehicle 20 identified from the list, to the server 30. The reservation information management unit 312 of the server 30 acquires information relevant to the exercise vehicle 20 identified from the list, and completes the reservation for the exercise vehicle 20. The reservation information management unit 312 registers the reservation information relevant to the reservation for the exercise vehicle 20, in the reservation information DB 323, in association with the vehicle ID. After the registration in the reservation information DB 323, the reservation information management unit 312 sends a notice of the completion of the reservation registration for the exercise vehicle 20, to the user terminal 40.

FIG. 10 is a diagram showing an example of the reservation information that is stored in the reservation information DB 323. As illustrated in FIG. 10, the reservation information is managed as a reservation information table for each vehicle ID. For information that is registered in the reservation information table, a field can be added, changed or removed when appropriate.

In FIG. 10, the reservation information table has fields of reservation ID, user ID, planned getting-on spot, planned getting-on date and hour, planned getting-off spot, planned getting-off date and hour, use purpose, PW and service state. In the reservation ID, identification information (reservation ID) for uniquely identifying the reservation for the exercise vehicle 20 is stored. In the user ID, identification information (user ID) for uniquely identifying the user using the training opportunity that is provided in the exercise vehicle is stored.

In the planned getting-on spot, information indicating a spot where the user plans to get on the exercise vehicle 20 is stored. For example, the planned getting-on spot is position information (latitude and longitude) indicating the position of the getting-on spot. The position information can include identification information (for example, link number) about a road, identification information (for example, node number) about an intersection or the like, address and the like. In the planned getting-on date and hour, information indicating a date and hour (a date, a hour and the like) when the user plans to get on the exercise vehicle 20 is stored. In the planned getting-off spot, information indicating a spot where the user plans to get off the exercise vehicle 20 is stored. In the planned getting-off date and hour, information indicating a date and hour when the user plans to get off the riding exercise vehicle 20 is stored. Information to be stored in the planed getting-off spot and information to be stored in the planned getting-off date and hour are the same as the information to be stored in the planned getting-on spot and the information to be stored in the planed getting-on date and hour, respectively.

In the use purpose, information indicating a main purpose of the use of exercise vehicle 20 that is selected by the user at the time of the acceptance of the reservation is stored. For example, information such as "diet", "health maintenance", "cardiopulmonary strengthening", "muscle strength maintenance" and "muscle strengthening" is stored. In the PW, information indicating an authentication word when the user uses the training device 50 equipped in the vehicle is stored. For example, the user can use the training device 50, by inputting the PW to the training device 50 after power-on. The PW may be set by the user at the time of the acceptance of the reservation, or may be generated by the server 30 based on the reservation ID and the date and hour of the use. In the case where the PW is generated by the server 30, a notice of the generated PW is given to the user terminal 40, together with a notice of the fixed reservation. In the case where the information to be stored in the PW is absent, information (for example, "---" or a blank) indicating the absence of the information is stored. In the service state, a state of execution of the service about the previously registered reservation for the exercise vehicle 20 is stored. For example, in the case where the execution of the reserved service is completed, "completion" is stored. In the case where the reserved service is being provided, "in execution" is stored. In the case where the reserved service is not executed, "non-execution" is stored.

Exercise Vehicle

Figure 11:
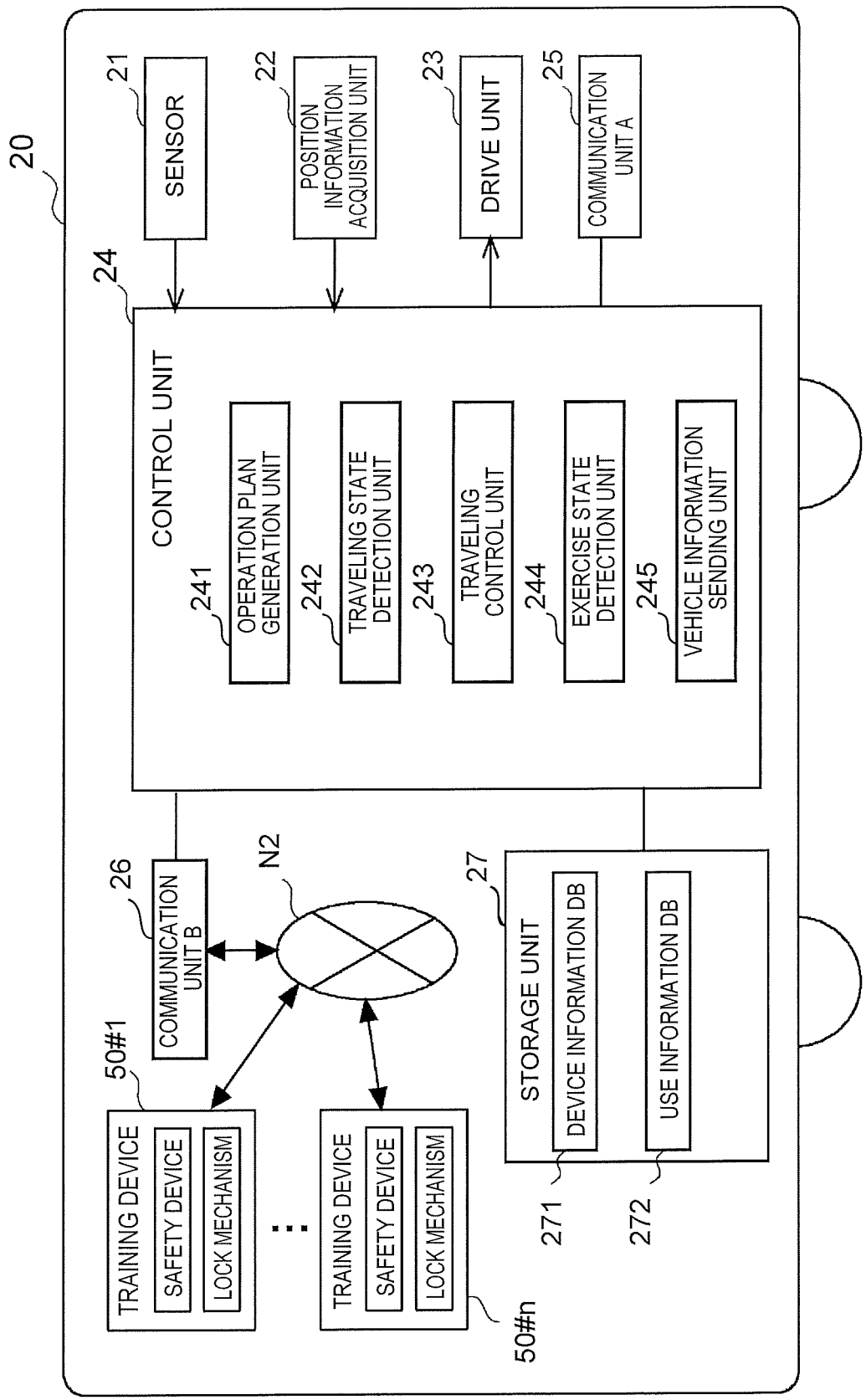
FIG. 11 is a diagram showing an example of a functional configuration of an exercise vehicle.

Next, the exercise vehicle 20 will be described with reference to FIG. 11. FIG. 11 is a diagram showing an example of the functional configuration of the exercise vehicle 20. The exercise vehicle 20 includes a sensor 21, a position information acquisition unit 22, a drive unit 23, a control unit 24, a communication unit A 25, a communication unit B 26, and the storage unit 27, as functional constituent elements. The exercise vehicle 20 generates a traveling route in accordance with the operation command acquired from the center server 10, and travels on a road along the route by an appropriate method for the autonomous traveling, while sensing the periphery of the exercise vehicle 20.

The sensor 21 is an aggregation of sensors mounted on the exercise vehicle 20, and is means for sensing the state of the exercise vehicle 20 and the environment in the periphery of the exercise vehicle 20 in order to acquire necessary information for the autonomous traveling. Examples of the sensor 21 for sensing the state of the exercise vehicle 20 include an acceleration sensor, a speed sensor, a magnetic field sensor, and a gyroscope sensor. Examples of the sensor 21 for sensing the periphery of the exercise vehicle 20 include a camera (a stereo camera, a visible light camera, an infrared camera and the like), a laser scanner, a LIDAR (Light Detection and Ranging, Laser Imaging Detection and Ranging), and a radar. For example, information acquired by the sensor 21 is given to the control unit 24, and is used for recognizing an obstacle or a traveling lane in the periphery of the exercise vehicle 20. For example, the information detected by the sensor 21 may include data relevant to a congestion degree in the vicinity of the exercise vehicle 20, speeds of surrounding vehicles, or the like. The data is acquired by road-vehicle communication or inter-vehicle communication.

The position information acquisition unit 22 is means for acquiring the current position of the exercise vehicle 20, and is configured to include, for example, a receiver such as a global positioning system (GPS) and a global navigation satellite system (GLONASS). Information (for example, latitude and longitude) acquired by the position information acquisition unit 22 is given to the control unit 24, and for example, is used for the calculation of the route along which the exercise vehicle travels and a process of guidance to the destination. The position information acquisition unit 22 may detect the moving direction and vehicle speed of the exercise vehicle 20, with the speed sensor, the acceleration sensor, the magnetic sensor, the gyroscope sensor and the like, and may autonomously evaluate the position information about the exercise vehicle 20. The information acquired by the position information acquisition unit 22 is sent to the center server 10 or server 30 connected to the network N1, through the communication unit A 25, periodically or in response to a request from the center server 10 or the server 30.

The drive unit 23 is means for causing the exercise vehicle 20 to travel, based on a control command generated by the traveling control unit 243. For example, the drive unit 23 is configured to include a drive motor for driving wheels, an inverter, a brake, a steering motor, a steering mechanism and the like. The drive unit 23 appropriately increases or decreases controlled variables of the motor, the inverter, the brake, the steering and the like, in accordance with the control command, so that the exercise vehicle 20 performs the autonomous traveling.

The control unit 24 is a computer that controls the exercise vehicle 20 based on the information acquired from the sensor 21, the information acquired from the position information acquisition unit 22 and the information acquired through the communication unit B 26 from the training device 50 equipped in the vehicle. For example, the control unit 24 is constituted by a microcomputer including a processor such as a CPU. The control unit 24 causes the processor to read and execute a variety of programs and a variety of data that are stored in the storage unit 27, and thereby, provides a variety of processing functions appropriate for predetermined purposes. The control unit 24 provides at least an operation plan generation unit 241, a traveling state detection unit 242, the traveling control unit 243, an exercise state detection unit 244 and a vehicle information sending unit 245, as functional modules. The functional modules that are provided by the control unit 24 may be realized by hardware, or may be realized by a plurality of computers that cooperate with each other.

The operation plan generation unit 241 acquires the operation command from the center server 10 that cooperates with the server 30, and generates the operation plan for the exercise vehicle 20. The operation command includes information relevant to a departure place and destination in an instruction to the exercise vehicle 20, a route passing through the destination, and the like. Accordingly, the operation plan generation unit 241 generates the operation plan, based on the destination and the route to the destination that are given from the center server 10 and the position of the exercise vehicle 20 that is acquired by the position information acquisition unit 22.

Furthermore, the operation plan generation unit 241 refers to a device information DB 271 and a use information DB 272 that are held in the storage unit 27, and changes the planned traveling route to an alternate route, based on the use information about one or more training devices 50 equipped in the vehicle. For example, an alternate route allowing the user during exercise to perform the exercise continuously and safely is selected. The operation plan includes the thus generated data relevant to the route along which the exercise vehicle 20 travels and data specifying processes that should be performed by the exercise vehicle 20 on a part or a whole of the route. Examples of the data included in the operation plan include the following (1) and (2).

(1) Data Expressing the Route Along which the Exercise Vehicle 20 travels as an Aggregation of Road Links For example, by referring to the map data stored in the storage unit 27, the route along which the exercise vehicle 20 travels may be automatically generated based on the departure place and destination in the instruction and the route passing through the destination. The route along which the exercise vehicle 20 travels and that passes through the destination may be identified by an external device such as the center server 10 or the server 30, instead of the exercise vehicle 20. The external device such as the center server 10 may acquire the position information from the exercise vehicle 20, and may identify the route along which the exercise vehicle should travel, in accordance with a planned operation route, and the operation command may include the data about the route.

(2) Data Expressing Processes that should be Performed by the Exercise Vehicle 20 at Spots on the Route The processes that should be performed by the exercise vehicle 20 include, for example, a little stop at the planned getting-on spot where the user gets on the exercise vehicle 20, a little stop at the planned getting-off spot where the user gets off the exercise vehicle 20, and an instruction of a reserved movement between spots, but are not limited to them. For example, an instruction such as "causing the user to get on or get off the exercise vehicle 20" at the planned getting-on spot or the planned getting-off spot is included. The operation plan generated by the operation plan generation unit 241 is output to the traveling control unit 243 described later.

The traveling state detection unit 242 detects a peripheral situation necessary for the autonomous traveling, based on the data acquired by the sensor 21. Objects to be detected include, for example, the number and positions of lanes, the number and positions of vehicles existing in the periphery of the exercise vehicle 20, the number and position of obstacles (for example, a pedestrian, a bicycle, a structure and a building) existing in the periphery of the exercise vehicle 20, the structure of a road, and a traffic sign, but are not limited to them. Any object may be detected if the object is necessary for the autonomous traveling. For example, in the case where the sensor 21 is a camera (a stereo camera, a visible light camera or an infrared camera) or the like, a physical object in the periphery of the exercise vehicle 20 is detected by an image processing of image data picked up by the sensor 21.

In addition to the detection of the physical object in the periphery of the exercise vehicle 20, the traveling state detection unit 242 may perform tracking of the detected physical object (may continue to detect the detected object). For example, it is possible to evaluate the relative speed of the physical object, from the difference between the coordinates of the physical object detected before one step and the current coordinates of the physical object. The data relevant to the peripheral situation detected by the traveling state detection unit 242 is output to the traveling control unit 243 described later. Direction information that is relevant to the traveling of the exercise vehicle 20 and that is acquired through the sensor 21 is sent to the center server 10 or server 30 connected to the network N1 through the communication unit A 25, periodically or in response to a request from the center server 10 or the server 30.

The traveling control unit 243 generates the control command for controlling the autonomous traveling, based on the operation plan generated by the operation plan generation unit 241, the data relevant to the peripheral situation detected by the traveling state detection unit 242, and the position information about the exercise vehicle 20 acquired by the position information acquisition unit 22. For example, the traveling control unit 243 generates the control command, such that the exercise vehicle 20 travels along a predetermined route and an obstacle does not enter a predetermined safe area around the exercise vehicle 20.

Further, the traveling control unit 243 reflects a control requirement for the traveling state that is output from the exercise state detection unit 244, in the control command. For example, the exercise state detection unit 244 outputs the control requirement for the traveling state, to the traveling control unit 243, such that the traveling speed change amount and steering amount of the exercise vehicle 20 are equal to or smaller than predetermined thresholds, based on the use information about the training device 50. The traveling control unit 243 generates the control command such that the control requirement output from the exercise state detection unit 244 is reflected. The generated control command is output to the drive unit 23. The traveling control unit 243 may generate the control command with the use information reflected, based on the use information for each training device stored in the use information DB 272, regardless of the control requirement output from the exercise state detection unit 244. As the method of generating the control command for the autonomous traveling, a known method can be employed.

Furthermore, the traveling control unit 243 generates the instruction to actuate the lock mechanism and the safety device, for the training device 50 equipped in the vehicle. For example, the traveling control unit 243 predicts the occurrence of a sudden steering or deceleration for avoiding the collision with an obstacle, based on the data relevant to the peripheral situation detected through the traveling state detection unit 242. Then, before the occurrence of the sudden steering or deceleration, the traveling control unit 243 gives the instruction to actuate the lock mechanism and the safety device, to each training device connected to the in-vehicle network (network N2), through the communication unit B 26. The microcomputer of each training device actuates the lock mechanism and safety device of the training device, in accordance with the actuation instruction given through the communication unit B 26.

The exercise state detection unit 244 periodically acquires the use information indicating the state of the use from the training device 50 equipped in the vehicle, through the communication unit B 26. The exercise state detection unit 244 stores the acquired use information for each training device, in the user information DB 272, in association with the identification information (device ID) for uniquely identifying the training device 50. Examples of the use information include whether the power is on, the use status, the menu item and the current exercise load amount.

Then, the exercise state detection unit 244 generates the control requirement for the traveling state of the exercise vehicle 20, based on the use information acquired from each training device 50, and outputs the control requirement to the traveling control unit 243. The exercise state detection unit 244 identifies the training device 50 that is used by the user in the vehicle, based on the information about each training device, as exemplified by information of whether the power is on and the use status. Further, the exercise state detection unit 244 identifies the content of the training of the user, based on information such as the menu item and the current exercise load amount. For example, the exercise state detection unit 244 generates the control requirement for the traveling speed of the exercise vehicle 20, the speed change amount and the steering amount, depending on the type of the training device 50 for which the use is identified and the training content. For example, in the case of identifying the aerobic exercise that is performed in the standing posture, as exemplified by jogging or running using the training device 50, the exercise state detection unit 244 generates the control requirement for causing the exercise vehicle 20 to travel at a speed allowing the securement of the stability of the user that is performing the exercise in the standing posture.

The vehicle information sending unit 245 sends the vehicle information about the exercise vehicle 20 stored in the storage unit 27, to the server 30 connected to the network N1, through the communication unit A 25, periodically or in response to the request from the server 30. The vehicle information sending unit 245 adds the vehicle ID for uniquely identifying the exercise vehicle 20, to the vehicle information, and sends the vehicle information to the server 30. As described in FIG. 9, the vehicle information includes the information indicating the operator ID, the operating hours, the vehicle size, the capacity, the number of the training devices 50 equipped in the vehicle, and the training content.

The communication unit A 25 is communication means for connecting the exercise vehicle 20 to the network N1. The communication unit A 25 is the same as the communication unit 13, and therefore, the description of the communication unit A 25 is omitted. The communication unit B 26 is communication means for connecting the control unit 24 to the in-vehicle network (network N2) constructed in the vehicle. For example, the communication unit B 26 includes a LAN interface board and a wireless communication circuit for wireless communication.

To the in-vehicle network, one or more training devices (50 #1 to 50 # n) equipped in the vehicle are connected. As described in FIG. 3 and FIG. 4, each training device includes the lock mechanism and the safety device. The training devices 50 equipped in the vehicle may include a training device that does not include the lock mechanism and the safety device.

In the storage unit 27, which includes a main storage device and an auxiliary storage unit, the above-described vehicle information about the exercise vehicle 20 and information for functioning as an exercise vehicle, as exemplified by the map data, are stored. Further, in the storage unit 27, the training devices 50 equipped in the vehicle, and the thresholds (the traveling speed, the change amount in traveling speed, and the steering amount) at which the traveling state is restricted depending on the menu item provided by each training device are stored. Furthermore, in the storage unit 27, the device information DB 271 for managing each training device equipped in the vehicle and the user information DB 272 for managing the use state of each training device are constructed.

FIG. 12 is a diagram showing an example of the device information that is stored in the device information DB 271. As illustrated in FIG. 12, device information about the training devices 50 equipped in the vehicle is managed as a device information table. For information that is stored in the device information table, a field can be added, changed or removed when appropriate.

In FIG. 12, the device information table has fields of device ID, name, disposed position, orientation, lock mechanism, safety device and menu item. In the device ID, identification information (device ID) for uniquely identifying the training device 50 is stored. For example, the device ID may be the MAC address of the training device 50. In the name, the device name (treadmill, fitness bike, or the like) of the training device 50 is stored. In the disposed position, information indicating a position in the vehicle where the training device 50 is disposed is stored. For example, the interior of the vehicle is sectioned into a plurality of block areas, and an identification number or the like indicating a sectioned block area is stored.

In the orientation, information indicating the orientation of the training device 50 set in the vehicle is stored. For example, in the case where the training device 50 is disposed so as to be parallel to the front-rear direction of the exercise vehicle 20, "front-rear" is stored. In the case where the training device is disposed so as to be orthogonal to the front-rear direction, "right-left" is stored. In the lock mechanism, information indicating whether the training device 50 includes the lock mechanism is stored. In the safety device, information indicating a content of a safety device included in the training device 50 is stored. In FIG. 12, for a device ID "M01", "included" is shown as the information to be stored in the lock mechanism, and "overturning prevention" is shown as the information to be stored in the safety device. In the case where the information to be stored in the lock mechanism or the safety device is absent, information (for example, "---" or a blank) indicating the absence of the information is stored.

In the menu item, information relevant to the menu item sectioned stepwise with respect to the exercise load amount depending on the user's purpose of the use of the training device 50 is stored. For example, for a name "treadmill" of the device ID "M01", information such as "walking", "jogging" or "light running (7 km/h)" is stored. The menu item is presented to the user through the display unit of the training device 50.

FIG. 13 is a diagram showing an example of the use information about the training device 50 that is stored in the use information DB 272. As illustrated in FIG. 13, the use information about the training device is managed as a use state table for each training device. For information that is stored in the use state table for each training device, a field can be added, changed or removed when appropriate.

In FIG. 13, the use state table has fields of user ID, hour, use status, selection menu and exercise load amount. In the user ID, the user ID of the user that uses the training device 50 is stored. In the hour, the hour information (date and hour) when the use information is acquired is stored. FIG. 13 shows an example in which the use information is acquired at an interval of a unit time such as one minute. In the use status, status information indicating the use state of the training device is stored. For example, "non-use" indicating a state where the power is off, "ready" indicating a state after the power-on and before the start of the exercise (the depression of the start button), or "in use" indicating a state where the user is performing the exercise using the training device is stored in the use status.

In the selection menu, information indicating the menu item fixed by the user operation is stored. For example, in the case where the training device is a treadmill, information relevant to the menu item such as "walking", "jogging" or "light running (7 km/h)" is stored. In the exercise load amount, information that indicates an exercise load amount and that is provided through an electric motor, an actuator or the like built in the training device 50 is stored. For example, assuming that the controlled variable at the time of the maximum load of the electric motor, the actuator or the like is 100%, information indicating a relative load degree is stored.

Processing Flow

Figure 14:
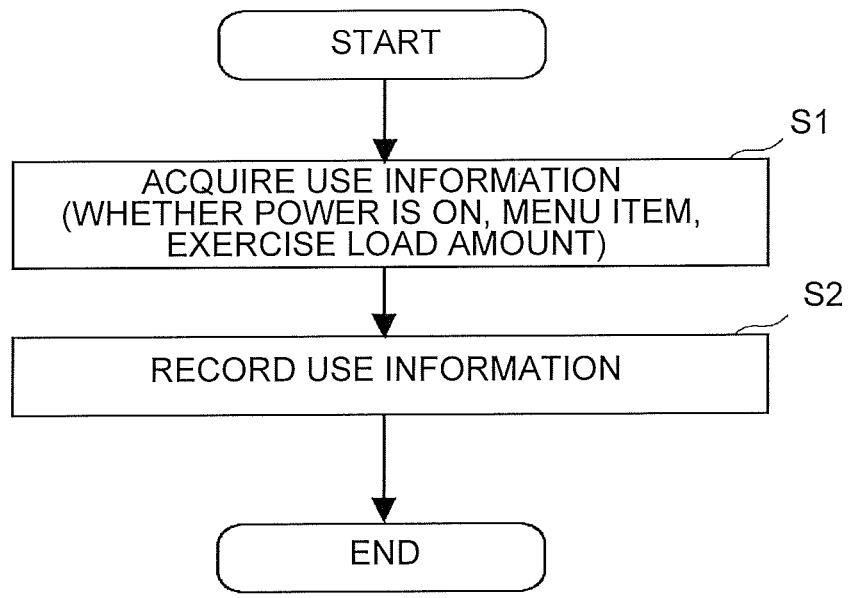
FIG. 14 is a flowchart showing an example of an acquisition process of acquiring the use information.

Next, processes in the exercise support system 1 according to the embodiment will be described with reference to FIG. 14 to FIG. 18. The processes in FIG. 14 to FIG. 18 are periodically executed by each exercise vehicle constituting the exercise support system 1. FIG. 14 is a flowchart showing an example of an acquisition process of acquiring the use information about the training device 50. The acquisition process is executed in the exercise vehicle 20.

In FIG. 14, the exercise vehicle 20 acquires the use information indicating the state of the use of each training device, from one or more training devices 50 equipped in the vehicle, through the communication unit B 26 (S1). The use information includes information indicating whether the power of the training device is on, the use status, the menu item selected by the user, and information indicating the current exercise load amount and the like. The use information is acquired in association with the device ID for each training device.

The exercise vehicle 20 stores the use information acquired through the communication unit B 26 for each training device, in the use information DB 272 constructed in the storage unit 27 (S2). The use information about the training device equipped in the vehicle is stored in the use state table for each vehicle ID, in association with the hour information. After the process of S2, the process in FIG. 14 is ended.

By the above process, in the exercise support system 1 according to the embodiment, the use information about each training device equipped in the exercise vehicle can be acquired periodically at an interval of a unit time such as one minute. The use information can be stored in the use state table for each training device, in association with the hour information. For example, the control unit 24 of the exercise vehicle 20 according to the embodiment can control the traveling state of the exercise vehicle 20, based on the use information for each vehicle ID that is stored in the use information DB 272 constructed in the storage unit 27.

Figure 15:
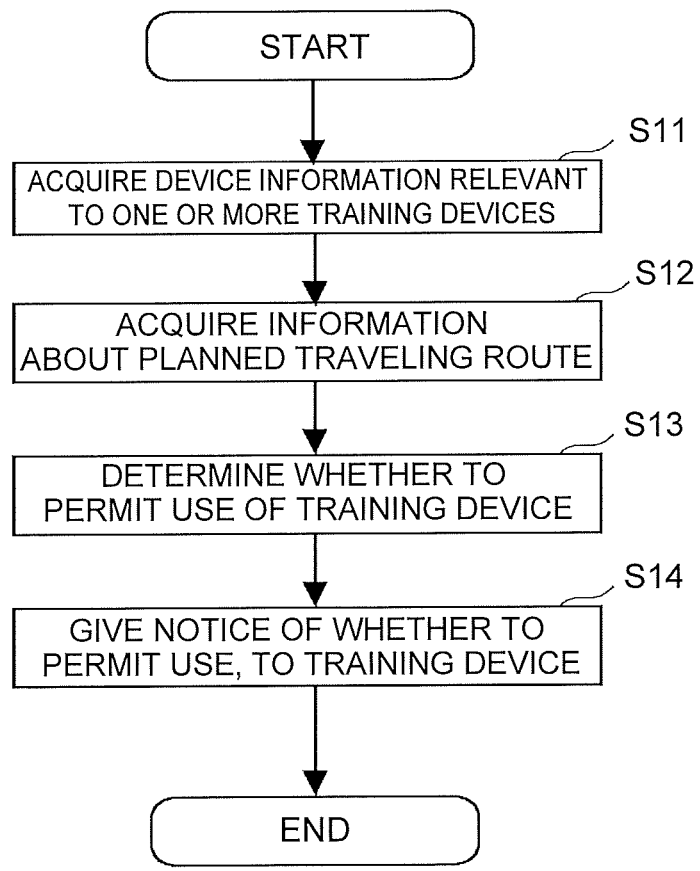
FIG. 15 is a flowchart showing an example of a process of prohibiting use of the training device based on information about a planned traveling route.

Next, FIG. 15 will be described. FIG. 15 is a flowchart showing an example of a process of prohibiting the use of the training device 50 equipped in the vehicle, based on the information about the planned traveling route. In FIG. 15, the exercise vehicle 20 refers to the device information DB 271 constructed in the storage unit 27, and acquires the device information relevant to one or more training devices 50 equipped in the exercise vehicle 20 (S11). Further, the exercise vehicle 20 acquires the information about the route to the destination (planned getting-off spot) to which the exercise vehicle 20 plans to travel (S12). For example, the exercise vehicle 20 acquires the information (link information, node information or the like) about the route along which the exercise vehicle 20 planes to travel to the destination (planned getting-off spot) and that is generated by the operation plan generation unit 241 based on the operation command from the center server 10.

The exercise vehicle 20 determines whether to permit the use of each training device, based on the information about the planned traveling route and the device information about the training device equipped in the vehicle (S13). For example, the exercise vehicle 20 prohibits the use of a predetermined training device 50 or prohibits the exercise for a predetermined menu item in the menu provided by the training device 50, depending on attributes of the route such as the number of right or left turns on the planned traveling route and the number of installed traffic lights. The use restriction condition of the route attribute about the type of the training device 50 and the menu item can be previously held in the storage unit 27 or the like. The exercise vehicle 20 reads the above condition held in the storage unit 27 or the like, and determines whether to permit the use of the training device 50 or the menu item, based on whether the condition is satisfied.

As described with use of FIG. 5, for example, in the case where the number of right or left turns on the planned traveling route or the number of installed traffic lights is relatively large, the exercise vehicle 20 prohibits the use of the treadmill and the like that provide the aerobic exercise to be performed in the standing posture, as exemplified by jogging or running. Further, the exercise vehicle 20 prohibits the selection of a menu item with a relatively high exercise load, even when the menu item indicates an indoor exercise to be performed in the sitting posture. Furthermore, the exercise vehicle 20 prohibits the use of a training device 50 that does not include means such as the lock mechanism and the safety device, which is means allowing the securement of the safety of the user during traveling.

The exercise vehicle 20 outputs an instruction to prohibit the use of the training device 50 and an instruction to prohibit the use of the menu item, to the training device 50, through the communication unit B 26 (S14). For example, the microcomputer of the training device 50 displays information indicating the prohibition of the use of the training device, or information indicating that the menu item cannot be selected, on the display device of the display unit. The information relevant to the restriction of the use is presented to the user that uses the exercise vehicle 20, through the display unit of each training device. The exercise vehicle 20 may inform the user about the information indicating that the use of the training device 50 is restricted or the information about the menu item, for example, through a display device, a speaker and the like that are included in the exercise vehicle 20. After the process of S14, the process in FIG. 15 is ended.

By the above process, in the exercise support system 1 according to the embodiment, the exercise vehicle 20 can prohibit the use of a training device 50 that is of one or more training devices 50 equipped in the vehicle and that is relevant to a predetermined exercise type, based on the information about the planned traveling route. Further, the exercise vehicle 20 can prohibit the selection of a predetermined menu item using the training device 50. Furthermore, the exercise vehicle 20 can prohibit the use of the training device 50 that does not include means such as the lock mechanism and the safety device, which is means allowing the securement of the safety of the user during traveling.

In the exercise support system 1 according to the embodiment, it is possible to prohibit the use of the training device 50 and the selection of the menu item, based on the attribute information about the planned traveling route, and therefore, it is possible to secure the safety of the user at the time of the training during movement.

Figure 16:
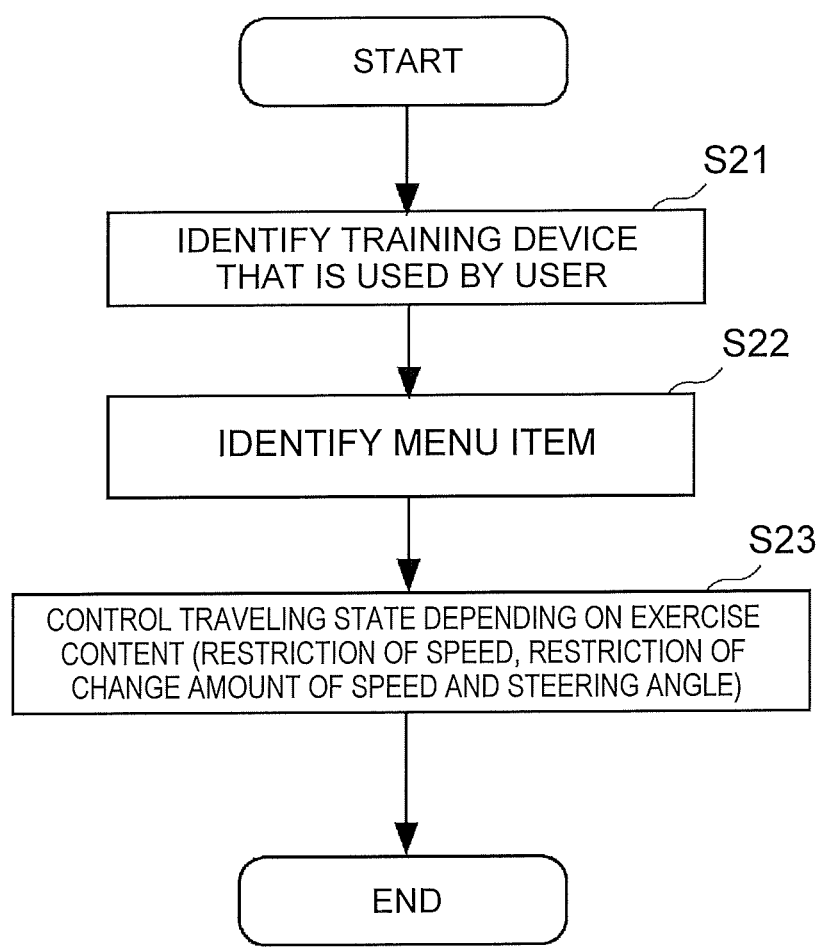
FIG. 16 is a flowchart showing an example of a process of controlling traveling depending on an exercise content.

Next, FIG. 16 will be described. FIG. 16 is a flowchart showing an example of a process of controlling traveling depending on the content of an exercise that is executed in the exercise vehicle 20. In FIG. 16, the exercise vehicle 20 refers to the use information DB 272 constructed in the storage unit 27, and identifies a training device 50 that is of one or more training devices 50 equipped in the vehicle and that is used by the user (S21). For example, the exercise vehicle 20 identifies a training device 50 for which "ready" or "in use" is stored in the use status field of the use state table. Then, the exercise vehicle 20 identifies the menu item decided by the user (S22). For example, the exercise vehicle 20 acquires the menu item stored in the selection menu field of the use state table. Further, the exercise vehicle 20 acquires the information that is stored in the exercise load amount field and that indicates the degree of the exercise load. In the case where the use status of the training device 50 is "ready", the exercise vehicle 20 waits until the menu item can be acquired.

The exercise vehicle 20 controls the traveling state of the exercise vehicle 20, based on the identified training device 50 and the information indicating the fixed menu item and the degree of the exercise load (S23). The traveling state of the exercise vehicle 20 is controlled depending on the exercise content (training content) of the user that is indicated by the above information. Similarly to the process in FIG. 15, the exercise vehicle 20 reads control conditions (the traveling speed, the thresholds and the like) that corresponds to the training device 50, the fixed menu item and the exercise load amount and that are previously held in the storage unit 27 or the like, and controls the traveling state.

As described with use of FIG. 5, for example, the traveling speed of the exercise vehicle 20 is set to a traveling speed allowing the securement of the stability of the user during exercise, depending on the type of the training device 50, the menu item and the current exercise load amount. Similarly, the speed change amount and steering amount due to acceleration or deceleration at the time of a right or left turn or at the time of a start or stop at a traffic light are restricted to equal to or smaller than the thresholds, depending on the type of the training device 50, the menu item and the current exercise load amount. After the process of S23, the process in FIG. 16 is ended.

By the above process, in the exercise support system 1 according to the embodiment, it is possible to identify the training device 50 that is used by the user during traveling, the selected menu item, and the current exercise load amount (the information indicating the degree of the exercise load). Then, the exercise vehicle 20 according to the embodiment can control the traveling state of the exercise vehicle 20, depending on the exercise content (training content) of the user that is indicated by the above information. For example, the exercise vehicle 20 can set the traveling speed of the exercise vehicle 20, to a traveling speed allowing the securement of the stability of the user during exercise. Further, for example, the exercise vehicle 20 can restrict the speed change amount and steering amount due to acceleration or deceleration at the time of a right or left turn or at the time of a start or stop at a traffic light, to equal to or smaller than the thresholds.

As a result, in the exercise vehicle 20, it is possible to restrict the traveling speed depending on the type of the training device 50, the menu item and the exercise load amount, and therefore, it is possible to secure the safety of the user that performs the exercise using the training device. Similarly, in the exercise vehicle 20, the speed change amount and steering amount due to acceleration or deceleration at the time of a right or left turn or at the time of a start or stop at a traffic light are restricted to equal to or smaller than the thresholds, and therefore, it is possible to secure the stability of the posture of the user that uses the training device 50. With the exercise support system 1 according to the embodiment, it is possible to secure the safety of the user at the training in a movable object during traveling.

Figure 17:
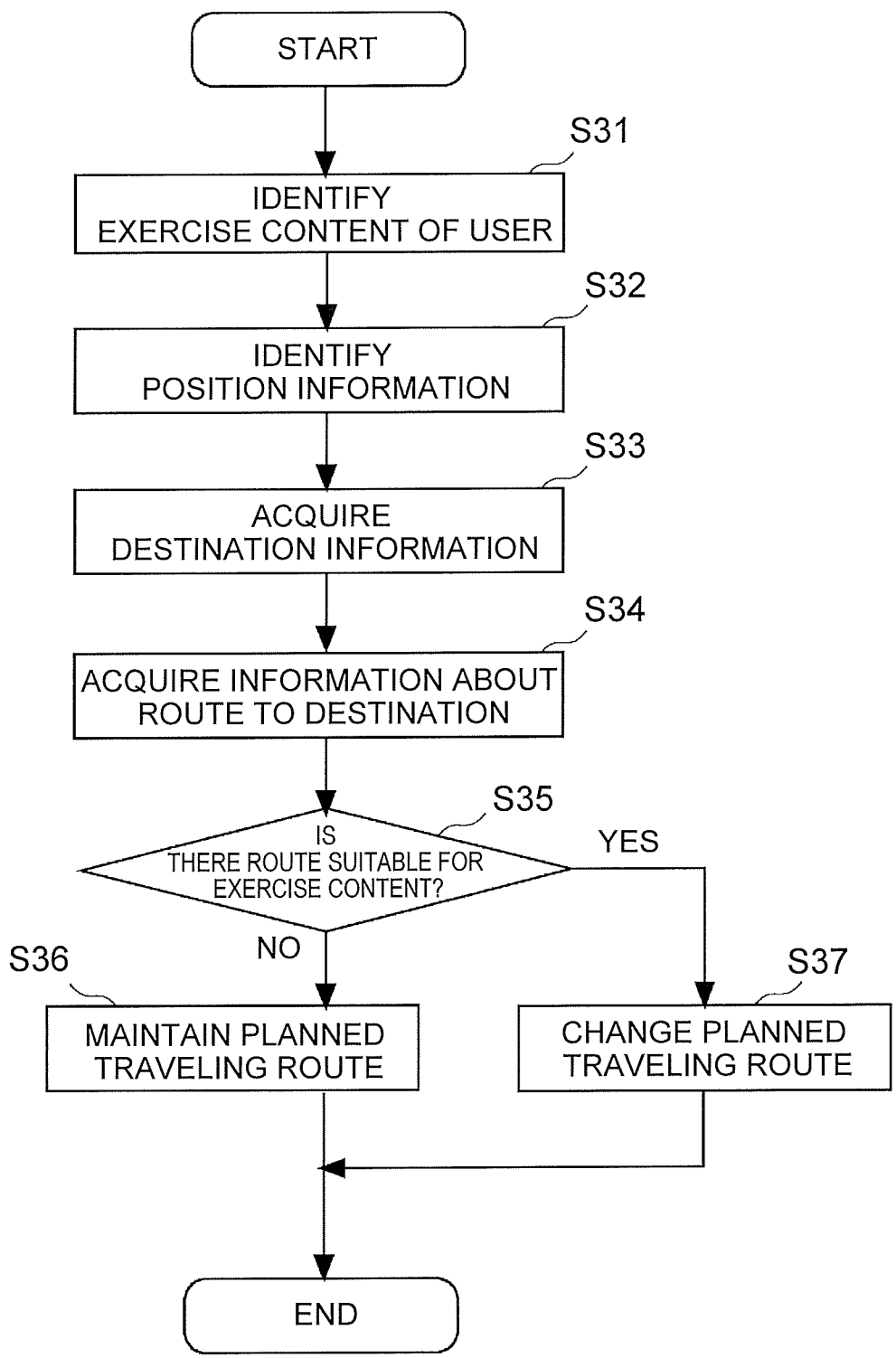
FIG. 17 is a flowchart showing an example of a process of changing the traveling route depending on the exercise content.

Next, FIG. 17 will be described. FIG. 17 is a flowchart showing an example of a process of changing the traveling route depending on the exercise content of the user. In FIG. 17, the exercise vehicle 20 identifies the exercise content of the user using the training device 50 (S31). The exercise vehicle 20 identifies the training device 50 that is being used by the user, and the fixed menu item, from the information stored in the use state table for each device ID that is stored in the use information DB 272 constructed in the storage unit 27. The exercise vehicle 20 acquires the training device 50 for which "in use" is stored in the use status field of the use state table, and the menu item stored in the selection menu field.

The exercise vehicle 20 acquires the current position information about the exercise vehicle 20 (S32). Further, the exercise vehicle 20 acquires the information about the destination (planned getting-off spot) to which the exercise vehicle 20 moves (S33). The information about the destination is included in the operation command from the center server 10. Then, the exercise vehicle 20 identifies the information about the route from the current position of the exercise vehicle 20 as the departure spot to the destination (S34). The exercise vehicle 20 refers to the map data stored in the storage unit 27, and identifies the information about a plurality of routes from the current position of the exercise vehicle 20 as the departure spot to the destination. For example, as described in FIG. 5, the exercise vehicle 20 identifies the route information about the routes R2 to R4 along which the exercise vehicle 20 can travel and that is other than the planned traveling route R1. The identified route information is transferred for the process of S35.

In the process of S35, the exercise vehicle 20 determines whether the information about the identified routes includes a route suitable for the exercise content of the user. The exercise vehicle 20 determines whether there is a route suitable for the exercise content of the user, based on the exercise content of the user and attributes of each route (the number of right or left turns on the route, the number of installed traffic lights, the distance and the like).

For example, suppose that the exercise content of the user is the running (light) using a treadmill. As described with use of FIG. 5, in the exercise to be performed in the standing posture, the position of the center of gravity is high, and therefore, it can be said that the relative stability during traveling is low. Accordingly, for example, the exercise vehicle 20 compares relative attributes between the identified routes and the planned traveling route, and determines whether there is a route on which the number of right or left turns and the number of installed traffic lights are small and the straight line distance is long. Similarly to FIG. 15, the determination criterion can be previously held in the storage unit 27 or the like, in association with the type of the training device 50 and the menu item. The exercise vehicle 20 reads the determination criterion held in the storage unit 27 or the like, and determines whether there is a route suitable for the exercise content of the user.

In the case where there is no route suitable for the exercise content of the user (S35, "No"), the exercise vehicle 20 transitions to the process of S36, and maintains the planned traveling route along which the exercise vehicle 20 is currently traveling. On the other hand, in the case where there is a route suitable for the exercise content of the user (S35, "Yes"), the exercise vehicle 20 transitions to the process of S37. In the process of S37, the exercise vehicle 20 changes the current planned traveling route to the route suitable for the exercise content of the user in the information about the identified routes. After the process of S36 or S37, the process in FIG. 17 is ended.

By the above process, in the exercise support system 1 according to the embodiment, the exercise vehicle 20 can identify the exercise content (training content) of the user using the training device 50. The exercise vehicle 20 can identify the current position information of the exercise vehicle 20 and the destination spot. The exercise vehicle 20 can acquire the current position information of the exercise vehicle 20 and the destination information, and can identify a plurality of alternate routes from the current position as the departure spot to the destination spot. The exercise vehicle 20 can determine whether there is a route suitable for the exercise content of the user, by comparing attributes (the number of right or left turns on the route, the number of installed traffic lights, the distance, and the like) of the planned traveling route with attributes of the identified alternate routes.

The exercise vehicle 20 according to the embodiment can change the planned traveling route to an alternate route suitable for the exercise content of the user. In the exercise support system 1 according to the embodiment, the exercise vehicle 20 can move along the route allowing the securement of the safety during traveling, depending on the exercise content of the user.

Next, FIG. 18 will be described. FIG. 18 is a flowchart showing an example of a process of actuating the lock mechanism and safety device of the training device 50 during traveling. In the following, it is assumed that each training device equipped in the vehicle includes the lock mechanism and the safety device for securing the safety of the user at the time of the training during traveling.

In FIG. 18, the exercise vehicle 20 refers to the use information DB 272 constructed in the storage unit 27, and identifies a training device 50 that is of one or more training devices 50 equipped in the vehicle and that is used by the user (S41). For example, the exercise vehicle 20 identifies a training device 50 for which "ready" or "in use" is stored in the use status field of the use state table. Further, the exercise vehicle 20 detects the situation in the periphery of the exercise vehicle 20 at the current time (S42). The situation in the periphery of the exercise vehicle 20 is detected by the traveling state detection unit 242, based on the data acquired by the sensor 21.

The exercise vehicle 20 determines whether the occurrence of, for example, a sudden steering or deceleration for avoiding the collision with an obstacle is predicted, based on the detected situation in the periphery of the exercise vehicle 20 (S43). For example, the exercise vehicle 20 evaluates the relative speed and the relative motion vector with respect to the physical object detected by the sensor 21, by the tracking process of the physical object. Then, the exercise vehicle 20 predicts whether a sudden steering, a sudden deceleration or the like for avoiding the collision with the tracked physical object occurs. Here, the "sudden steering or deceleration", for example, is a steering or speed change exceeding the threshold of the steering amount or speed change that is used in the traveling control for the securement of the safety of the user during exercise.

In the case where the occurrence of a sudden steering or deceleration is predicted (S43, "Yes"), the exercise vehicle 20 transitions to the process of S44. On the other hand, in the case where the occurrence of a sudden steering or deceleration is not predicted (S43, "No"), the exercise vehicle 20 ends the process in FIG. 18.

In the process of S44, the exercise vehicle 20 actuates the lock mechanism and safety device of the training device 50 that is used by the user. For example, the exercise vehicle 20 designates the device ID of the training device, and gives an instruction to actuate the lock mechanism and the safety device, to the training device 50 that is used by the user. The microcomputer of the training device 50, which is connected to the in-vehicle network, receives the instruction from the exercise vehicle 20, through the control unit 24 and communication unit B 26 of the exercise vehicle 20, and actuates the lock mechanism and safety device of the training device 50. By the actuation of the lock mechanism and the safety device described with use of FIG. 3 and FIG. 4, it is possible to secure the safety of the user at the time of the exercise during traveling in the case of the occurrence of an unexpected steering or deceleration. After the process of S44, the process in FIG. 18 is ended.

By the above process, in the exercise support system 1 according to the embodiment, the exercise vehicle 20 can identifies the training device 50 that is used by the user in the vehicle. Further, the exercise vehicle 20 can predict whether, for example, a sudden steering, a sudden deceleration or the like for avoiding the collision with an obstacle occurs, based on the situation in the periphery of the exercise vehicle 20 that is detected by the traveling state detection unit 242. When the occurrence of the sudden steering, the sudden deceleration or the like is predicted, the exercise vehicle 20 according to the embodiment can actuate the lock mechanism and safety device of the training device 50 that is used by the user. With the exercise support system 1 according to the embodiment, it is possible to secure the safety of the user at the time of the exercise during traveling in the case of the occurrence of an unexpected steering or deceleration.

First Modification

From a standpoint of the securement of the safety of the user at the time of the indoor exercise during traveling, the content (training content) of the exercise using the training device 50 may be restricted depending on the traveling state of the exercise vehicle 20. In a first modification, the exercise vehicle 20 is configured to restrict the training content that is provided by the training device 50 equipped in the vehicle, depending on the traveling state. The configuration of the exercise support system 1 according to the first modification is the same as the configuration in the first embodiment, and the description of the configuration is omitted.

FIG. 19 is a flowchart showing an example of a process that is executed in the exercise vehicle 20 according to the first modification. The process in FIG. 19 is periodically executed. In FIG. 19, the exercise vehicle 20 acquires information identifying the traveling state of the exercise vehicle 20 (S51). For example, the exercise vehicle 20 acquires the vehicle speed, moving direction, acceleration value and others of the exercise vehicle 20 that are detected by the sensor 21. Further, the exercise vehicle 20 acquires the position information that indicates the traveling position of the exercise vehicle 20 and that is acquired through the position information acquisition unit 22. Furthermore, the exercise vehicle 20 acquires the control command generated by the traveling control unit 243. The acquired information is temporarily stored in a predetermined area of the main storage device constituting the storage unit 27.

The exercise vehicle 20 identifies tendency of change in traveling state in a predetermined period (S52). For example, the exercise vehicle 20 acquires measurement information about the traveling state of the exercise vehicle 20 that is stored in the storage unit 27 in a predetermined period (for example, in the latest three minutes). Then, the exercise vehicle 20 identifies the tendency of the change in traveling state, as exemplified by a traveling path, a change in speed, the number of occurrences of acceleration or deceleration, a change in moving direction, and a transition of the control command. The identified change tendency is transferred for the process of S54.

The exercise vehicle 20 refers to the device information DB 271, and acquires the device information relevant to one or more training devices 50 equipped in the exercise vehicle 20 (S53). Then, the exercise vehicle 20 restricts the training content, based on the identified change tendency and the device information about each training device (S54).

For example, in the case where acceleration or deceleration is repeated in the predetermined period as the change tendency of the exercise vehicle 20, the exercise vehicle 20 prohibits the use of the treadmill and the like that provide the aerobic exercise to be performed in the standing posture, as exemplified by jogging or running. Further, in the case where the frequency of change in moving direction is relatively high as the change tendency of the exercise vehicle 20, the exercise vehicle 20 prohibits the selection of a menu item with a relatively high exercise load, even when the menu item indicates an indoor exercise to be performed in the sitting posture. Such restriction conditions for the use of the training device 50 and the menu item depending on the traveling state are previously held in the storage unit 27 or the like. The exercise vehicle 20 reads the above restriction conditions held in the storage unit 27 or the like, and decides the restriction of the training content depending on the traveling state.

The exercise vehicle 20 outputs the content of the restriction (for example, an instruction to prohibit the use of the device, or an instruction to restrict the menu item) to the corresponding training device 50, through the communication unit B 26 (S55). For example, the microcomputer of the training device 50 displays the prohibition of the use of the training device 50, on the display device of the display unit. Similarly, the microcomputer of the training device 50 displays information indicating that the menu item cannot be selected, on the display device of the display unit. Through the display unit of the training device, the information relevant to the use restriction allowing the securement of the safety at the time of the training during traveling is presented to the user that uses the exercise vehicle 20. After the process of S55, the process in FIG. 19 is ended.

By the above process, in the exercise support system 1 according to the first modification, the exercise vehicle 20 can restrict the training content of the user using the training device 50 during traveling, based on the traveling state of the exercise vehicle 20. Also in the first modification, the exercise support system 1 can secure the safety of the user at the time of the training during movement.

Second Modification

The control technique shown in the first embodiment and the control technique shown in the first modification may be combined. That is, the exercise vehicle 20 may control the traveling state of the exercise vehicle 20 depending on the exercise content (training content) of the user in the vehicle, and may restrict the use state of the training device depending on the traveling state during the movement along the route. In the second modification, the exercise vehicle 20 can perform a more fine-grained control of the traveling state and a more fine-grained of the use state of the training device 50, depending on the traveling situation. With the exercise support system 1 in the second modification, it is possible to secure the safety of the user at the time of the training during traveling, in consideration of the traveling situation or the traveling environment.

Other Embodiments

Each of the above embodiments is just an example, and the disclosure for the embodiments can be carried out, while being appropriately modified without departing from the spirit. The processes and means described in the disclosure can be arbitrarily combined to be carried out, as long as technical consistency is kept.

A process described as a process that is executed by one device may be executed by a plurality of devices in cooperation. Alternatively, processes described as processes that are executed by different devices may be executed by one device. In the computer system, the hardware configuration (server configuration) that realizes each function can be flexibly changed.

A program that realizes one of the above functions with an information processing device or another machine or device (hereinafter, referred to as a computer or the like) can be recorded in a recording medium that can be read by the computer or the like. Then, the computer or the like reads and executes the program in the recording medium, and thereby, can provide the function.

Here, the recording medium that can be read by the computer or the like means a recording medium that accumulate information such as data and program by an electrical, magnetic, optical, mechanical or chemical action and that can be read by the computer or the like. Among such recording media, examples of a recording medium that can be detached from the computer or the like include a flexible disk, a magneto-optical disc, a CD-ROM, a CD-R/W, a DVD, a Blu-ray disc, a DAT, a 8 mm tape, and a memory card such as a flash memory. Further, examples of a recording medium fixed in the computer or the like include a hard disk and a ROM.

What is claimed is:

1. A processing device comprising:
   circuitry configured to:

identify a first training device that is of one or more training devices equipped in a movable object for providing a training opportunity to a passenger and that is used by the passenger, and at least one of control a traveling state of the movable object depending on use information of the first training device and restrict use states of the one or more training devices depending on the traveling state of the movable object, wherein the one or more training devices do not control the traveling state of the moveable object.

2. The processing device according to claim 1, wherein the circuitry is configured to prohibit use of a second training device of the one or more training devices based on information about a route through which the movable object plans to travel.

3. The processing device according to claim 1, wherein the circuitry is configured to change a traveling route through which the movable object travels based on the use information of the first training device.

4. The processing device according to claim 1, wherein the use information includes at least one of a power supply status, a use status, a menu item selected, and a current load amount.

5. The processing device according to claim 1, wherein the circuitry is configured to actuate a lock mechanism of the first training device that is being used by the passenger, when the circuitry determines that the circuitry is unable to control the traveling state of the movable object.

6. The processing device according to claim 5, wherein the circuitry is configured to actuate a safety device that secures a body of the passenger that uses the first training device.

7. The processing device according to claim 1, wherein the circuitry is configured to restrict use of the first training device depending on the traveling state of the movable object.

8. The processing device according to claim 7, wherein the circuitry is configured to present a menu item for a training allowing securement of safety to the passenger that uses the first training device.

9. A processing method comprising:
identifying a first training device that is of one or more training devices equipped in a movable object for providing a training opportunity to a passenger and that is used by the passenger, and at least one of controlling a traveling state of the movable object depending on use information of the first training device and restricting use states of the one or more training devices depending on the traveling state of the movable object, wherein the one or more training devices do not control the traveling state of the moveable object.

10. A non-transitory computer readable medium storing a program that causes a computer to execute:
identifying a first training device that is of one or more training devices equipped in a movable object for providing a training opportunity to a passenger and that is used by the passenger, and at least one of controlling a traveling state of the movable object depending on use information of the first training device and restricting use states of the one or more training devices depending on the traveling state of the movable object, wherein the one or more training devices do not control the traveling state of the movable object.

\* \* \* \* \*